(12) United States Patent
Jenkins et al.

(10) Patent No.: US 9,178,955 B1
(45) Date of Patent: Nov. 3, 2015

(54) MANAGING NETWORK BASED CONTENT

(75) Inventors: Jonathan A. Jenkins, Seattle, WA (US); Peter F. Hill, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 28 days.

(21) Appl. No.: 13/246,720

(22) Filed: Sep. 27, 2011

(51) Int. Cl.
G06F 15/173 (2006.01)
H04L 29/08 (2006.01)

(52) U.S. Cl.
CPC .......... H04L 67/28 (2013.01); H04L 29/08144 (2013.01); H04L 67/26 (2013.01)

(58) Field of Classification Search
USPC .......................................... 709/217, 226, 238
See application file for complete search history.

(56) References Cited

U.S. PATENT DOCUMENTS

| | | | |
|---|---|---|---|
| 5,634,064 | A | 5/1997 | Warnock et al. |
| 5,872,850 | A | 2/1999 | Klein et al. |
| 5,961,593 | A | 10/1999 | Gabber et al. |
| 6,049,812 | A | 4/2000 | Bertram et al. |
| 6,108,637 | A | 8/2000 | Blumenau |
| 6,138,156 | A | 10/2000 | Fletcher et al. |
| 6,195,679 | B1 | 2/2001 | Bauersfeld et al. |
| 6,430,624 | B1 | 8/2002 | Jamtgaard et al. |
| 6,549,941 | B1 | 4/2003 | Jaquith et al. |
| 6,560,620 | B1 | 5/2003 | Ching |
| 6,625,624 | B1 | 9/2003 | Chen et al. |
| 6,704,024 | B2 | 3/2004 | Robotham et al. |
| 6,785,864 | B1 | 8/2004 | Te et al. |
| 6,871,236 | B2 | 3/2005 | Fishman et al. |
| 6,944,665 | B2 | 9/2005 | Brown et al. |
| 6,963,850 | B1 | 11/2005 | Bezos et al. |
| 7,003,442 | B1 | 2/2006 | Tsuda |
| 7,051,084 | B1 | 5/2006 | Hayton et al. |
| 7,054,952 | B1 | 5/2006 | Schwerdtfeger et al. |
| 7,085,736 | B2 | 8/2006 | Keezer et al. |

(Continued)

FOREIGN PATENT DOCUMENTS

WO WO 2013/003631 A2 1/2013

OTHER PUBLICATIONS

Chen, H., et al., "Bringing Order to the Web: Automatically Categorizing Search Results," Proceedings of the SIGCHI Conference on Human Factors in Computing Systems, Apr. 1-6, 2000, pp. 145-152.

(Continued)

*Primary Examiner* — Joon H Hwang
*Assistant Examiner* — Abdulkader M Alriyashi
(74) *Attorney, Agent, or Firm* — Knobbe, Martens, Olson & Bear, LLP

(57) ABSTRACT

A process is provided for providing network content to a client computing device by one or more content providers in conjunction with a network computing provider. The client computing device requests a network resource from the network computing provider. The network computing provider provides the network resource request to a first content provider. The first content provider provides a request for one or more embedded resources associated with the network resource to at least one second content provider on the behalf of the network computing provider. The network computing provider obtains the requested network resource and one or more associated embedded resource from the first content provider and the at least one second content provider. The network computing provider may provide the obtained content to the client computing device for processing.

27 Claims, 19 Drawing Sheets

(56) References Cited

U.S. PATENT DOCUMENTS

| | | | |
|---|---|---|---|
| 7,159,023 B2 | 1/2007 | Tufts | |
| 7,171,478 B2 | 1/2007 | Lueckhoff et al. | |
| 7,191,211 B2 | 3/2007 | Tuli | |
| 7,353,252 B1 | 4/2008 | Yang et al. | |
| 7,373,313 B1 | 5/2008 | Kahle et al. | |
| 7,483,983 B1 | 1/2009 | Bonefas et al. | |
| 7,509,397 B1 | 3/2009 | Totty et al. | |
| 7,543,059 B2 | 6/2009 | Johnson et al. | |
| 7,610,382 B1 | 10/2009 | Siegel | |
| 7,624,047 B1 | 11/2009 | Round | |
| 7,792,944 B2 | 9/2010 | DeSantis et al. | |
| 7,831,582 B1 | 11/2010 | Scofield et al. | |
| 7,975,000 B2 | 7/2011 | Dixon et al. | |
| 7,996,912 B2 | 8/2011 | Spalink et al. | |
| 8,010,545 B2 | 8/2011 | Stefik et al. | |
| 8,015,496 B1 | 9/2011 | Rogers | |
| 8,060,463 B1 | 11/2011 | Spiegel | |
| 8,073,850 B1 | 12/2011 | Hubbard et al. | |
| 8,103,742 B1 | 1/2012 | Green | |
| 8,185,621 B2 | 5/2012 | Kasha | |
| 8,195,767 B2 | 6/2012 | Albrecht et al. | |
| 8,224,964 B1* | 7/2012 | Fredrickson et al. | 709/227 |
| 8,249,904 B1 | 8/2012 | DeSantis et al. | |
| 8,271,887 B2 | 9/2012 | Offer et al. | |
| 8,316,124 B1 | 11/2012 | Baumback et al. | |
| 8,336,049 B2 | 12/2012 | Medovich | |
| 2001/0039490 A1 | 11/2001 | Verbitsky et al. | |
| 2002/0026511 A1* | 2/2002 | Garcia-Luna-Aceves et al. | 709/226 |
| 2002/0030703 A1 | 3/2002 | Robertson et al. | |
| 2002/0073155 A1 | 6/2002 | Anupam et al. | |
| 2002/0103846 A1* | 8/2002 | Zisapel et al. | 709/105 |
| 2002/0194302 A1 | 12/2002 | Blumberg | |
| 2003/0023712 A1 | 1/2003 | Zhao et al. | |
| 2003/0041106 A1 | 2/2003 | Tuli | |
| 2004/0010543 A1* | 1/2004 | Grobman | 709/203 |
| 2004/0083294 A1 | 4/2004 | Lewis | |
| 2004/0139208 A1 | 7/2004 | Tuli | |
| 2004/0181613 A1 | 9/2004 | Hashimoto et al. | |
| 2004/0205448 A1 | 10/2004 | Grefenstette et al. | |
| 2004/0220905 A1 | 11/2004 | Chen et al. | |
| 2004/0243622 A1 | 12/2004 | Morisawa | |
| 2005/0010863 A1 | 1/2005 | Zernik | |
| 2005/0060643 A1 | 3/2005 | Glass et al. | |
| 2005/0138382 A1 | 6/2005 | Hougaard et al. | |
| 2005/0183039 A1 | 8/2005 | Revis | |
| 2005/0246193 A1 | 11/2005 | Roever et al. | |
| 2006/0015574 A1* | 1/2006 | Seed et al. | 709/219 |
| 2006/0077897 A1* | 4/2006 | Kotzin | 370/235 |
| 2006/0085766 A1 | 4/2006 | Dominowska et al. | |
| 2006/0095336 A1 | 5/2006 | Heckerman et al. | |
| 2006/0112167 A1 | 5/2006 | Steele et al. | |
| 2006/0122889 A1 | 6/2006 | Burdick et al. | |
| 2006/0168510 A1 | 7/2006 | Bryar et al. | |
| 2006/0184421 A1 | 8/2006 | Lipsky et al. | |
| 2006/0248195 A1* | 11/2006 | Toumura et al. | 709/226 |
| 2006/0248442 A1 | 11/2006 | Rosenstein et al. | |
| 2006/0277167 A1 | 12/2006 | Gross et al. | |
| 2006/0294461 A1 | 12/2006 | Nadamoto et al. | |
| 2007/0022072 A1 | 1/2007 | Kao et al. | |
| 2007/0027672 A1 | 2/2007 | Decary et al. | |
| 2007/0094241 A1 | 4/2007 | M. Blackwell et al. | |
| 2007/0124693 A1 | 5/2007 | Dominowska et al. | |
| 2007/0139430 A1 | 6/2007 | Korn et al. | |
| 2007/0168535 A1 | 7/2007 | Ikonen et al. | |
| 2007/0240160 A1 | 10/2007 | Paterson-Jones et al. | |
| 2007/0288589 A1 | 12/2007 | Chen et al. | |
| 2007/0288855 A1* | 12/2007 | Rohrabaugh et al. | 715/760 |
| 2008/0028334 A1 | 1/2008 | De Mes | |
| 2008/0104502 A1 | 5/2008 | Olston | |
| 2008/0183672 A1 | 7/2008 | Canon et al. | |
| 2008/0184128 A1 | 7/2008 | Swenson et al. | |
| 2008/0320225 A1 | 12/2008 | Panzer et al. | |
| 2009/0012969 A1 | 1/2009 | Rail et al. | |
| 2009/0132640 A1 | 5/2009 | Verma et al. | |
| 2009/0164924 A1 | 6/2009 | Flake et al. | |
| 2009/0187819 A1 | 7/2009 | Bonefas et al. | |
| 2009/0204478 A1 | 8/2009 | Kaib et al. | |
| 2009/0217199 A1 | 8/2009 | Hara et al. | |
| 2009/0248680 A1 | 10/2009 | Kalavade | |
| 2009/0254867 A1 | 10/2009 | Farouki et al. | |
| 2009/0282021 A1 | 11/2009 | Bennett | |
| 2009/0287698 A1 | 11/2009 | Marmaros et al. | |
| 2009/0327914 A1 | 12/2009 | Adar et al. | |
| 2010/0036740 A1 | 2/2010 | Barashi | |
| 2010/0057639 A1 | 3/2010 | Schwarz et al. | |
| 2010/0125507 A1 | 5/2010 | Tarantino, III et al. | |
| 2010/0131594 A1 | 5/2010 | Kashimoto | |
| 2010/0138293 A1 | 6/2010 | Ramer et al. | |
| 2010/0218106 A1 | 8/2010 | Chen et al. | |
| 2010/0293190 A1 | 11/2010 | Kaiser et al. | |
| 2010/0312788 A1 | 12/2010 | Bailey | |
| 2010/0318892 A1 | 12/2010 | Teevan et al. | |
| 2010/0332513 A1 | 12/2010 | Azar et al. | |
| 2011/0022957 A1 | 1/2011 | Lee | |
| 2011/0029854 A1 | 2/2011 | Nashi et al. | |
| 2011/0055203 A1 | 3/2011 | Gutt et al. | |
| 2011/0078140 A1 | 3/2011 | Dube et al. | |
| 2011/0078705 A1 | 3/2011 | Maclinovsky et al. | |
| 2011/0119661 A1 | 5/2011 | Agrawal et al. | |
| 2011/0161849 A1 | 6/2011 | Stallings et al. | |
| 2011/0173177 A1 | 7/2011 | Junqueira et al. | |
| 2011/0173637 A1 | 7/2011 | Brandwine et al. | |
| 2011/0178868 A1 | 7/2011 | Garg et al. | |
| 2011/0185025 A1 | 7/2011 | Cherukuri et al. | |
| 2011/0191327 A1 | 8/2011 | Lee | |
| 2011/0197121 A1 | 8/2011 | Kletter | |
| 2011/0246873 A1 | 10/2011 | Tolle et al. | |
| 2011/0289074 A1 | 11/2011 | Leban | |
| 2011/0296341 A1 | 12/2011 | Koppert | |
| 2011/0302510 A1 | 12/2011 | Harrison et al. | |
| 2012/0054316 A1* | 3/2012 | Piazza et al. | 709/219 |
| 2012/0072821 A1 | 3/2012 | Bowling | |
| 2012/0084433 A1 | 4/2012 | Bar-Caspi et al. | |
| 2012/0084644 A1 | 4/2012 | Robert et al. | |
| 2012/0096365 A1 | 4/2012 | Wilkinson et al. | |
| 2012/0110017 A1 | 5/2012 | Gu et al. | |
| 2012/0137201 A1 | 5/2012 | White et al. | |
| 2012/0143944 A1 | 6/2012 | Reeves et al. | |
| 2012/0150844 A1 | 6/2012 | Lindahl et al. | |
| 2012/0166922 A1 | 6/2012 | Rolles | |
| 2012/0198516 A1 | 8/2012 | Lim | |
| 2012/0215834 A1 | 8/2012 | Chen et al. | |
| 2012/0215919 A1 | 8/2012 | Labat et al. | |
| 2012/0284629 A1 | 11/2012 | Peters et al. | |
| 2012/0317295 A1 | 12/2012 | Baird et al. | |
| 2012/0331406 A1 | 12/2012 | Baird et al. | |
| 2013/0007101 A1 | 1/2013 | Trahan et al. | |
| 2013/0007102 A1 | 1/2013 | Trahan et al. | |
| 2013/0031461 A1 | 1/2013 | Hou et al. | |
| 2013/0080611 A1 | 3/2013 | Li et al. | |

OTHER PUBLICATIONS

Rao, H.C.-H., et al., "A Proxy-Based Personal Web Archiving Service," Operating Systems Review, 35(1):61-72, 2001.

Teevan, J., et al., "Changing How People View Changes on the Web," 2009, Proceedings of the 22$^{nd}$ Annual ACM Symposium on User Interface Software and Technology, New York, 2009, pp. 237-246.

Baumann, A., et al., Enhancing STEM Classes Using Weave: A Collaborative Web-Based Visualization Environment, Integrated Stem Education Conference, Apr. 2, 2011, Ewing, New Jersey, pp. 2A-1-2A-4.

De Carvalho, L.G., et al., Synchronizing Web Browsing Data With Browserver, Proceedings of the IEEE Symposium on Computers and Communications, Jun. 22-25, 2010, Riccione, Italy, pp. 738-743.

Close 'n' Forget Firefox add on, Evilfantasy's blog, http://evilfantasy.wordpress.com/2009/03/24/dose-%E2%80%98n%E2%80%99-forget-firefox-add-on/, retrieved Mar. 24, 2009, 1 page.

Bango, Rey, "How JS & Ajax work in Opera Mini 4", Nov. 2, 2007, XP055050107, Retrieved from the Internet.

(56) References Cited

OTHER PUBLICATIONS

Brinkmann, M., "Record and Share your browser history with Hooeey," ghacks.net, Feb. 26, 2008, 6 pages, printed on Jan. 25, 2013.

Considine, A., "The Footprints of Web Feet," The New York Times, Mar. 4, 2011, 3 pages, printed on Jan. 25, 2013.

EyeBrowse: Record, Visualize and Share your Browser History, Information Aesthetics, Sep. 18, 2009, 2 pages, printed on Jan. 25, 2013.

Feuerstein, Adam, "Flyswat Takes Aim," San Francisco Business Times, printed from http://www.bizjournals.com/sanfrancisco/stories/1999/10/25/story2.html?t=printable, Oct. 22, 1999, 2 pages.

Gabber, et al., "How to Make Personalized Web Browsing Simple, Secure, and Anonymous," Financial Cryptography, 16 pages (1997).

Gingerich, Jason, "Keycorp Making Site Into Portal," KRTBN Knight-Ridder Tribune Business News (South Bend Tribune, Indiana), Oct. 25, 1999, 2 pages.

Hopper, D. Ian, "Desktops Now Have Power to Comparison-Shop," Oct. 18, 1999, printed from http://www.cnn.com/TECH/computing/9910/18/r.u.sure/index.html, 3 pages.

Van Kleek, M., Introducing "Eyebrowse"—Track and share your web browsing in real time, Haystack Blog, Aug. 28, 2009, 3 pages, printed on Jan. 25, 2013.

Web page titled "RSS Ticker: Add-ons for Firefox," https://addons.mozilla.org/en-US/firefox/addon/rss-ticker/, 3 printed pages, printed on Feb. 7, 2013.

Web page titled "What Internet Users Do on a Typical Day, Trend Data (Adults), Pew Internet & American Life Project," printed from http://pewinternet.org/Static-Pages/Trend-Data-(Adults)/Online-Activities-Daily.aspx on Nov. 29, 2012, 4 pages.

\* cited by examiner

MANAGING NETWORK BASED CONTENT

BACKGROUND

Generally described, computing devices and communication networks can be utilized to exchange information. In a common application, a computing device can request content from another computing device via the communication network. For example, a user at a personal computing device can utilize a software browser application, typically referred to as a browser, to request a Web page from a server computing device via the Internet. In such embodiments, the user computing device can be referred to as a client computing device and the server computing device can be referred to as a content provider.

With reference to an illustrative example, a requested Web page or other content may be associated with a number of additional resources, such as images or videos, that are to be displayed with the Web page. These additional resources may be referred to as "embedded resources." In one specific embodiment, embedded resources of a Web page are identified by a number of embedded resource identifiers, such as uniform resource locators ("URLs") included in or associated with the Web page or network resource. In turn, software on the client computing devices, such as a browser, typically processes embedded resource identifiers to generate requests for the content. Accordingly, in order to satisfy a content request, one or more content providers will generally provide client computing devices data associated with the Web page as well as the data associated with the embedded resources.

In a typical embodiment, a client computing device may not request embedded resources associated with a requested Web page or other network resource until the Web page has been processed by the browser or other application to identify associated embedded resource identifiers. In many cases, the requirement that the client computing device request the network resource and associated embedded content sequentially can introduce inefficiency and delay in the service and processing of network content. For example, because a client computing device will not request embedded resources until it has obtained and processed the associated Web page, the presentation of the complete Web page to an end user can be delayed.

From the perspective of a user utilizing a client computing device, a user experience can be defined in terms of the performance and latencies associated with obtaining network content over a communication network, such as obtaining a Web page, processing embedded resource identifiers, generating requests to obtain embedded resources, and rendering content on the client computing device. Latencies and performance limitations of any of the above processes may diminish the user experience. Additionally, latencies and inefficiencies may be especially apparent on computing devices with limited network resources or connectivity such as netbooks, tablets, smartphones, and the like.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
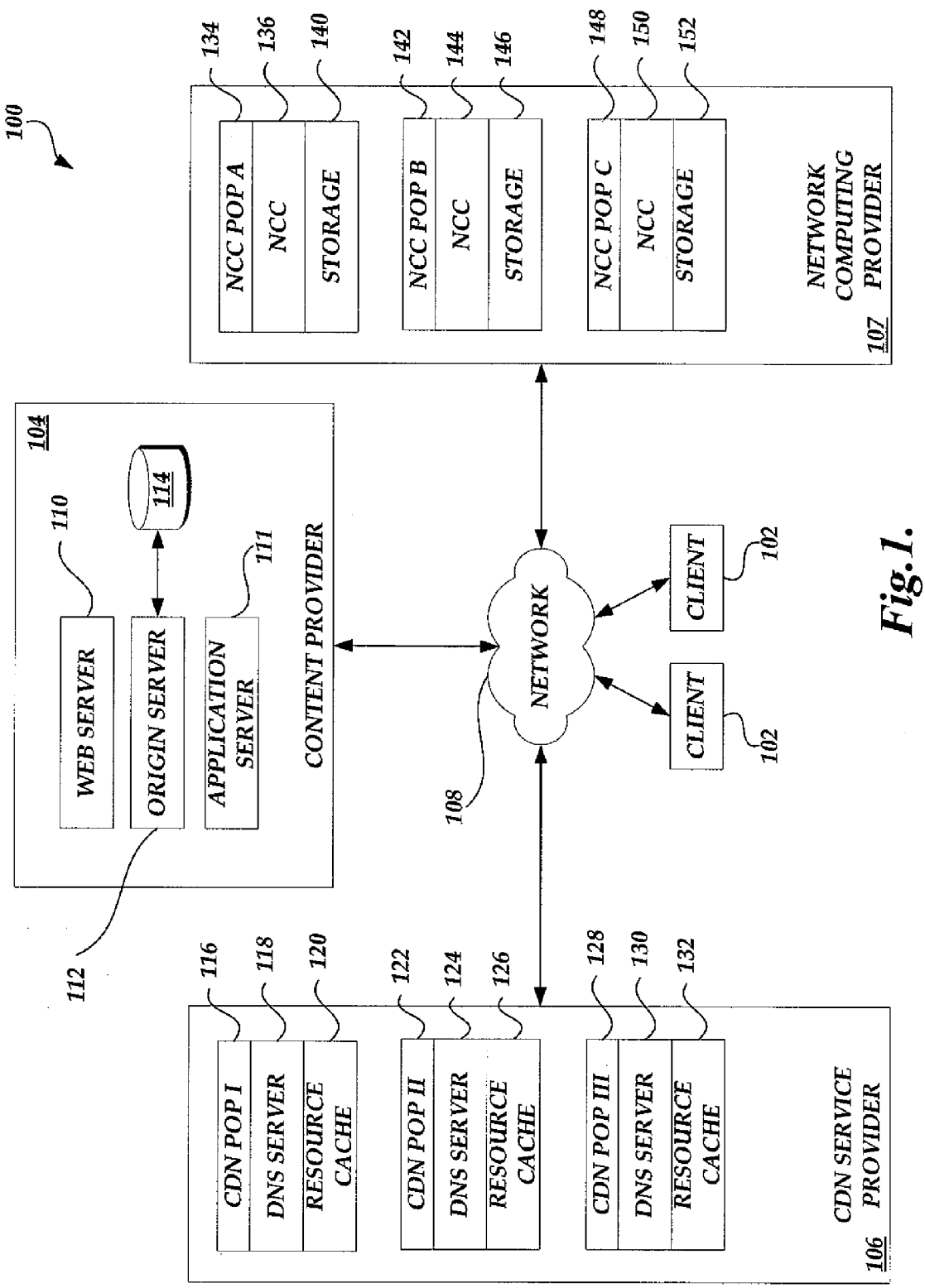
FIG. 1 is a block diagram illustrative of a content delivery environment including a number of client computing devices, a content provider, a content delivery network service provider, and a network computing provider.

Generally described, the present disclosure is directed to the provisioning of network content between client computing devices and content providers in conjunction with a network computing provider. Specifically, aspects of the disclosure will be described with regard to a request for a network resource by a client computing device, the provisioning of available resources associated with the request by a network computing provider, the transmission of a request for the network resource to a content provider by the network computing provider, and the processing of the request and transmission of requests for embedded resources associated with the network resource to a content delivery network provider. Although aspects of the embodiments described in the disclosure will focus, for the purpose of illustration, on the management of network content for a software browsing application, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

With reference to an illustrative example, a user may cause a client computing device to load a software browser application (henceforth referred to as a "browser") for accessing content provided by one or more content providers. Illustratively, content may include a collection of one or more network resources (e.g., a Web page) and associated embedded resources such as images, video, audio, text, executable code, and other resources. Subsequent to the browser being loaded, a user or automated browser process may cause the client computing device to transmit a request for a network resource to a network computing provider. In one embodiment, the request for a network resource may be included in a request for a new remote browse session at the network computing provider. The network resource request or new browse session request may include information identifying one or more sources for the requested content. The identifiers can be in the form of network addresses of network resources, such as a Web site or other network accessible piece of content. For example, the user may select or enter a URL, (e.g., http://www.xyzwebsite.com) into a browser window, causing the client computing device to transmit a request for a network resource or new browse session to the network computing provider, including the selected URL. The address or location of a network computing provider capable of servicing the network resource or browse session request may be hard-coded into the browser, may be configurable by the user, may be obtained from a network address service, or may be determined in any other way.

In one embodiment, responsive to a new browse session request being received from the client computing device, the network computing provider may instantiate, or cause to be instantiated, one or more computing components associated with the network computing provider. Illustratively, the one or more computing components at the network computing provider may perform one or more aspects of processing of requested network content prior to providing the processing results corresponding to the processed network content to the client computing device. The network computing provider and/or client computing device may further initialize a network connection between the network computing provider and client computing device.

The network computing provider may process the request for the network resource and identify content, such as embedded resources, other network resources, or information about the resources (e.g., meta-data), associated with the network resource corresponding to the network resource request. In one embodiment, the network computing provider may determine content associated with the network resource based on associations between the network resource request and content that has been associated with the requested network resource in the past, such as utilizing heuristic information For purposes of a specific example, a Web page served by a content provider may have included references to a specific image the last several times the Web page was provided to the network computing provider by the content provider. The network computing provider may accordingly determine, identify, and/or maintain an association between the Web page or requests for the Web page and the referenced image.

Subsequent to identifying content associated with the network resource based on the network resource request, the network computing provider may determine whether any of the identified content is accessible or stored in a storage component, such as cache component, or other data store associated with, or accessible to, the network computing provider. Illustratively, one or more pieces of the identified content may have been stored in a data store by the network computing provider as part of the network computing provider processing an earlier request for the network resource or embedded content, or as part of some other precaching or storage routine.

Subsequent to determining that content associated with the network resource request is available or stored in a cache component or data store associated with the network computing provider, the network computing provider may transmit the available content to the client computing device. The client computing device may store the transmitted content in a cache or data store local to the client computing device, and/or may begin processing or loading the transmitted content in anticipation of receiving additional content, such as the requested network resource and/or other associated embedded resources.

Independent of the identification and transmission of any available content associated with the network resource request, the network computing provider may provide a request for the requested network resource to a content provider. For example, the network computing provider may determine a network address of the content provider associated with the network resource request through a DNS resolver at the network computing provider, and may provide a request for the network resource to the content provider. In one embodiment, the request for the network resource may include a network component identifier consisting of information associated with the network computing provider, such as a network address of a network computing provider point of presence configured to receive content associated with the request. The request for the network resource may further include content availability identifiers or other information associated with available content identified at the network computing provider. For example, the network computing provider may provide a hash or checksum associated with one or more pieces of content determined to be associated with the network resource. Illustratively, the content availability identifiers may identify a presence and/or a version of content available (e.g. stored or cached) at the network computing provider as discussed above.

In one embodiment, the content provider may receive the request for the network resource and may process the network resource to identify any associated embedded resource identifiers. The content provider may provide requests for embedded resources to one or more content providers or content delivery network (CDN) providers based on the embedded resource identifiers. Additionally, the content provider may not transmit requests for content available at the network computing provider, such as content identified by content availability identifiers discussed above. In another embodiment, the content provider may provide the identification of the embedded resource identifiers to the network computing provider. In this embodiment, the network computing provider would transmit the request directly to the appropriate content providers, such as the CDN provider.

Responsive to the requests for embedded content, the one or more content providers or CDN providers may provide the requested embedded resources directly back to the network computing provider. Illustratively, content provided to the network computing provider may be accompanied by a token or other identifier indicating that the content is associated with the prior request for network content. The content provider may additionally provide the requested network resource to the network computing provider.

Upon receiving the requested network resource and associated content, the network computing provider may store one or more pieces of the received content in an associated cache or data store, and may update one or more associations between the network resource or request for network resource and the received content as discussed above. The network computing provider may perform any processing required on the received content and/or may provide the content to the client computing device for display. The client computing device may perform one or more additional processing steps on the received content for display. In one embodiment, the client computing device may display the received content with the available content previously provided to the client computing device by the network computing provider as discussed above.

FIG. 1 is a block diagram illustrative of a networked computing environment 100 for the management and processing of content requests. As illustrated in FIG. 1, the networked computing environment 100 includes a number of client computing devices 102 (generally referred to as clients) for requesting content and content processing from a content provider 104, CDN service provider 106, or network computing provider 107. In an illustrative embodiment, the client computing devices 102 can correspond to a wide variety of computing devices including personal computing devices, laptop computing devices, hand-held computing devices, terminal computing devices, mobile devices (e.g., mobile phones, tablet computing devices, etc.), wireless devices, various electronic devices and appliances, and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. The client computing devices 102 may have varied local computing resources such as central processing units and architectures, memory, mass storage, graphics processing units, communication network availability and bandwidth, etc.

The networked computing environment 100 can also include a content provider 104 in communication with the one or more client computing devices 102 or other service providers (e.g., CDN service provider 106, network computing provider 107, etc.) via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102 or other service providers. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such as additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the networked computing environment 100 can further include a CDN service provider 106 in communication with the one or more client computing devices 102 and other service providers via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1 as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

With further continued reference to FIG. 1, the networked computing environment 100 can also include a network computing provider 107 in communication with the one or more client computing devices 102, the CDN service provider 106, and the content provider 104 via the communication network 108. The network computing provider 107 illustrated in FIG. 1 also corresponds to a logical association of one or more computing devices associated with a network computing provider. Specifically, the network computing provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing any type of data used in the delivery and processing of network or computing resources, including but not limited to user data, state information, processing requirements, historical usage data, and resources from content providers that will be processed by an instance of an NCC 136, 144, 150 and transmitted to various client computers, etc. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. For example, a network computing provider 107 may maintain separate POPs for providing the NCC and the storage components. Additionally, although the NCC POPs 134, 142, 148 are illustrated in FIG. 1 as logically associated with a network computing provider 107, the NCC POPs will be geographically distributed throughout the communication network 108 in a manner to best serve various demographics of client computing devices 102. Additionally, one skilled in the relevant art will appreciate that the network computing provider 107 can be associated with various additional computing resources, such additional computing devices for administration of content and resources, and the like. Even further, one skilled in the relevant art will appreciate that the components of the network computing provider 107 and components of the CDN service provider 106 can be managed by the same or different entities.

With reference to FIGS. 2-11, the generation and processing of network content in the context of a remote browse session instantiated at a network computing provider 107 will be described. Further specific embodiments of content provision in the context of the networked computing environment of FIG. 1 will be described further below with respect to FIGS. 12-18.

With reference now to FIGS. 2-6, the interaction between various components of the networked computing environment 100 of FIG. 1 will be illustrated. Specifically, FIGS. 2-6 illustrate the instantiation and processing of a remote browse session, including the interaction between various components of the networked computing environment 100 for the exchange of content between a client computing device 102 and a content provider 104 via the network computing provider 107. For purposes of example, the illustrations have been simplified such that many of the components utilized to facilitate communications are not shown. One skilled in the relevant art will appreciate that such components can be utilized and that additional interactions would accordingly occur without departing from the spirit and scope of the present disclosure.

Figure 2:
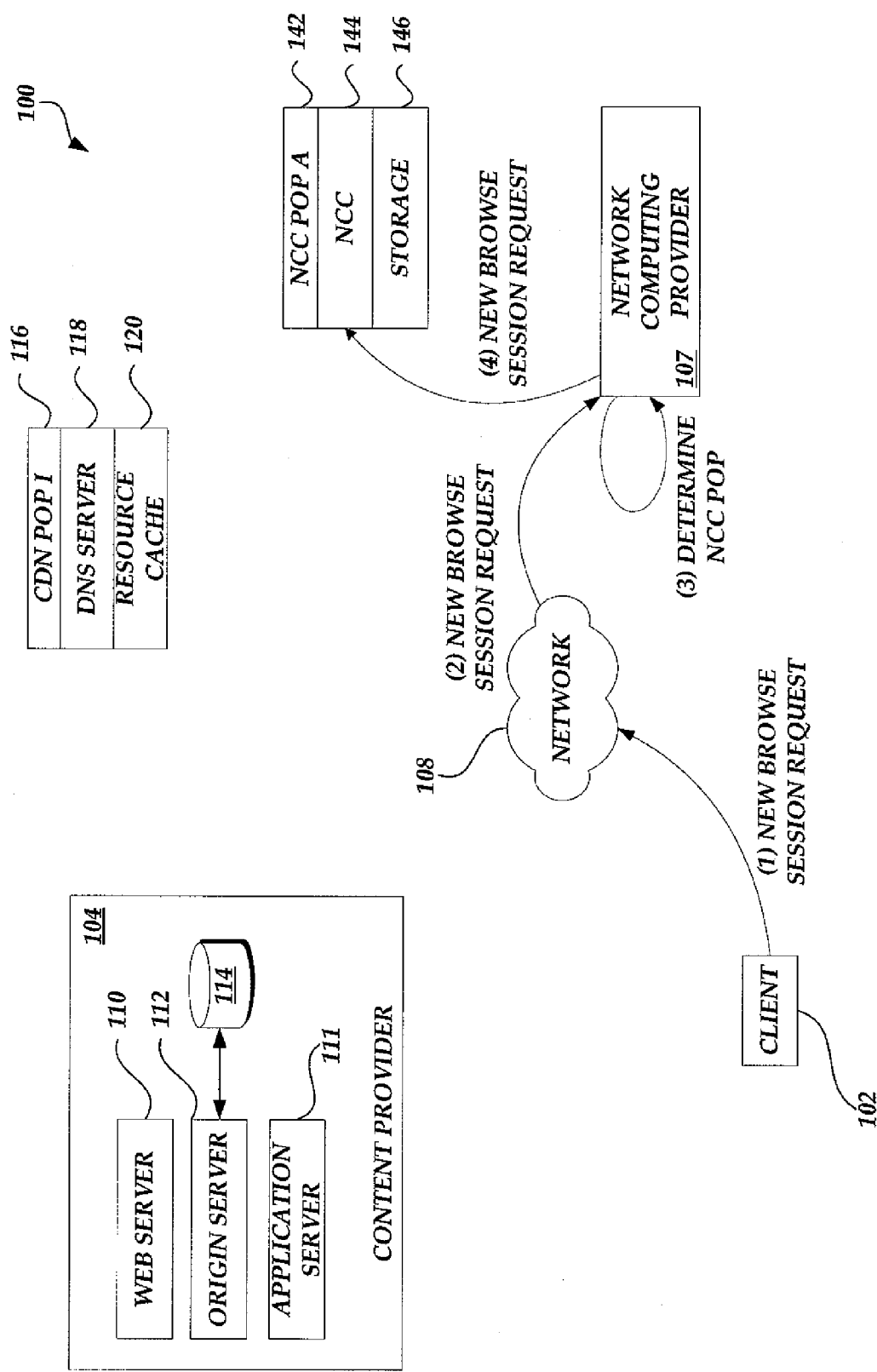
FIG. 2 is a block diagram of the content delivery environment of FIG. 1 illustrating the generation and processing of a new browse session request from a client computing device to a network computing provider.

With reference to FIG. 2, a process can begin with the generation and processing of a browse session request from a client computing device 102 to a network computing provider 107. Illustratively, the client computing device 102 may load a browser for viewing network content in response to an event or user request. Subsequent to the browser being loaded, the browser may be implemented to request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. As illustrated in FIG. 2, the browse session request is transmitted first to a network computing provider 107. In an illustrative embodiment, the network computing provider 107 utilizes a registration application program interface ("API") to accept browse session requests from the client computing device 102. The browse session request can include network address information corresponding to a requested network resource, which may be in any form, including, but not limited to, an Internet Protocol ("IP") address, a URL, a Media Access Control ("MAC") address, etc.

Subsequent to the receipt of the browse session request, the network computing provider 107 may select an associated network computing component (hereinafter "NCC") point of presence (hereinafter "POP") such as NCC POP 142 to service the browse session request. The selection of the NCC POP may determine the processing and network resources available to the instantiated virtual machine. The selection of processing and network resources and the provisioning of software at the NCC POP instance may be done, at least in part, in order to optimize communication with content providers 104 and client computing devices 102.

Figure 3:
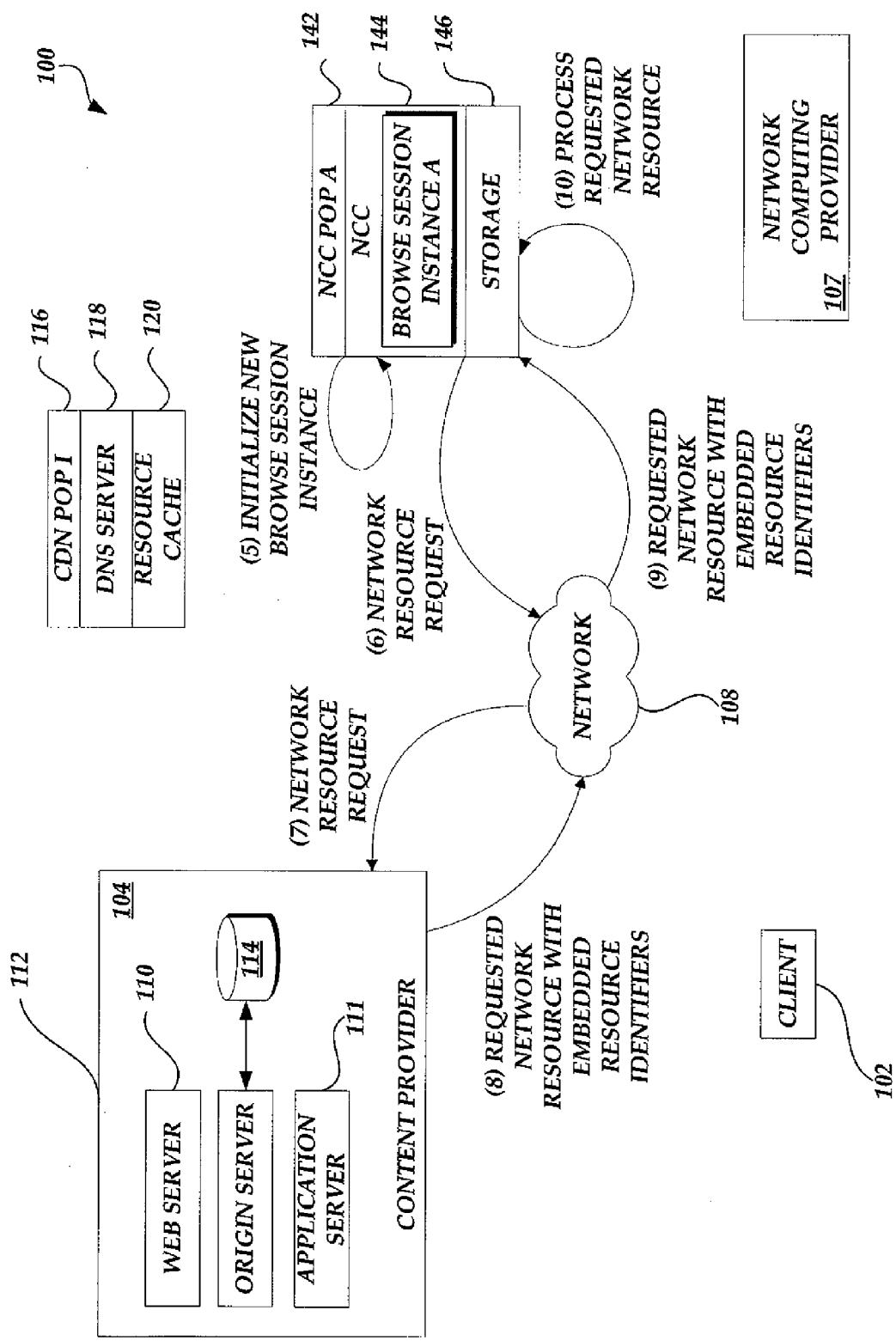
FIG. 3 is a block diagram of the content delivery environment of FIG. 1 illustrating the generation and processing of a request for a network resource from a network computing provider to a content provider.

With reference to FIG. 3, an illustrative interaction for generation and processing of a request for a network resource from a network computing provider 107 to a content provider 104 will be described. As illustrated in FIG. 3, the selected NCC POP 142 may generate a browse session corresponding to one or more content providers based on a browse session request, such as the illustrative browse session request depicted in FIG. 2 above. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session.

Subsequent to initializing a new browse session instance, NCC POP 142 may provide a request for a network resource to a content provider 104 based on a network address included in the browse session request. For example, a browse session request may include a URL for a Web page, such as "http://www.xyzsite.com/default.htm." NCC POP 142 may resolve the URL to an IP address through a DNS resolver associated with the network computing provider (not shown), and may request the Web page from the content provider 104 at the resolved IP address. In various embodiments, a network resource may be retrieved from any combination of content providers, content delivery network (hereinafter "CDN") servers, or caches associated with the network computing provider 107. For example, the network computing provider may check if a resource is stored in a local cache or in another server or service provider associated with the network computing provider 107. If a network resource is stored in a local or associated location, the NCC POP 142 may retrieve the network resource from the local or associated location rather than from the third party content provider 104 or CDN service provider 106. Illustratively, the NCC POP 142 may provide requests for any number of network resources as included in the browse session request, and may obtain these network resources from any number of different sources, sequentially or in parallel.

As illustrated in FIG. 3, the content provider 104 receives the resource request from the NCC POP 142 and processes the request accordingly. In one embodiment, the content provider 104 processes the resource request as if it were originally provided by the client computing device 102. For example, the content provider 104 may select the type of content, ordering of content, or version of content according to the requirements of the requesting client computing device 102. In another embodiment, the content provider 104 may be provided with information that provides information associated with the NCC POP 142 for utilization in providing the requested content (e.g., an available amount of processing resources or network bandwidth).

Subsequent to obtaining the requested network resource from the content provider 104 (or other source designated by the content provider), the NCC POP 142 may process the network resource to extract embedded resource identifiers and gather information for determination of a remote session browsing configuration. For example, a network resource such as a Web page may include embedded CSS style information and Javascript as well as embedded resource identifiers to additional resources such as text, images, video, audio, animation, executable code, and other HTML, CSS, and Javascript files. In the process of extracting the embedded resource identifiers, the NCC POP 142 may gather information about the processed network resources for later use in the determination of a remote session browsing configuration as discussed below with reference to FIG. 4.

Figure 4:
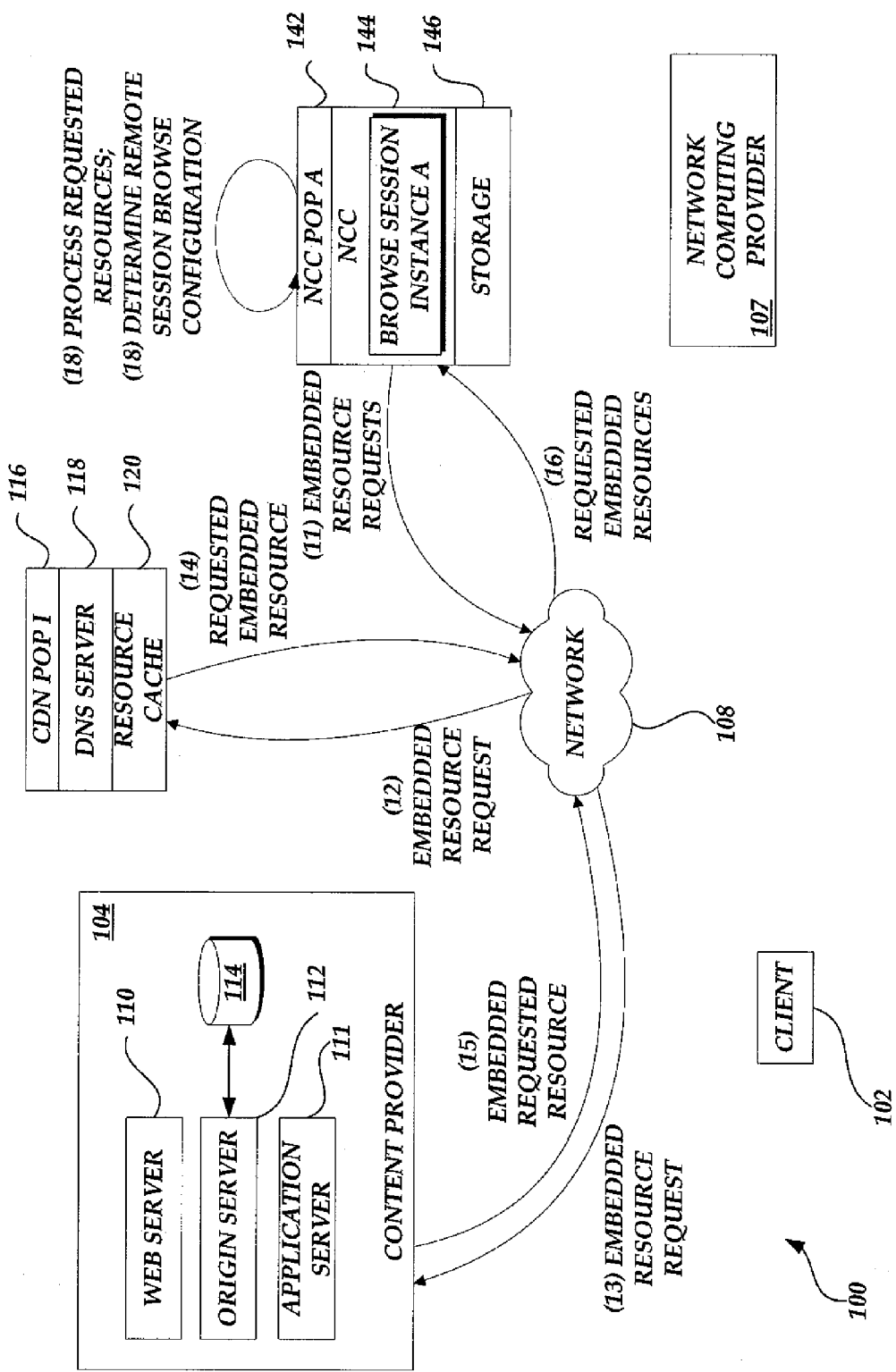
FIG. 4 is a block diagram of the content delivery environment of FIG. 1 illustrating the generation and processing of one or more requests corresponding to one or more embedded resources from a network computing provider to a content provider and content delivery network.

With reference to FIG. 4, an illustrative interaction for generation and processing of one or more requests corresponding to one or more embedded resources from a network computing provider to a content provider and content delivery network is disclosed. As illustrated in FIG. 4, the selected NCC POP 142 may provide resource requests to one or more sources of content such as content provider 104 and CDN POP 116. The resource requests may correspond to embedded resources based on one or more embedded resource identifiers extracted from a requested network resource (e.g., a Web page) as described in FIG. 3 above. In various embodiments, embedded resources may be retrieved from any combination of content providers, CDN servers, or caches associated with the network computing provider 107. For example, the network computing provider may check if an embedded resource is stored in a local cache or in another server or service provider associated with the network computing provider 107. If an embedded resource is stored in a local or associated location, the NCC POP 142 may retrieve the embedded resource from the local or associated location rather than the third party content provider or CDN. Illustratively, the NCC POP 142 may provide requests for any number of embedded resources referenced by a network resource, and may obtain these embedded resources from any number of different sources, sequentially or in parallel. Subsequent to obtaining the requested resources, the NCC POP 142 may process the resources and requested content to determine a remote session browsing configuration for the processing and communication of content to the client computing device 102.

Figure 5:
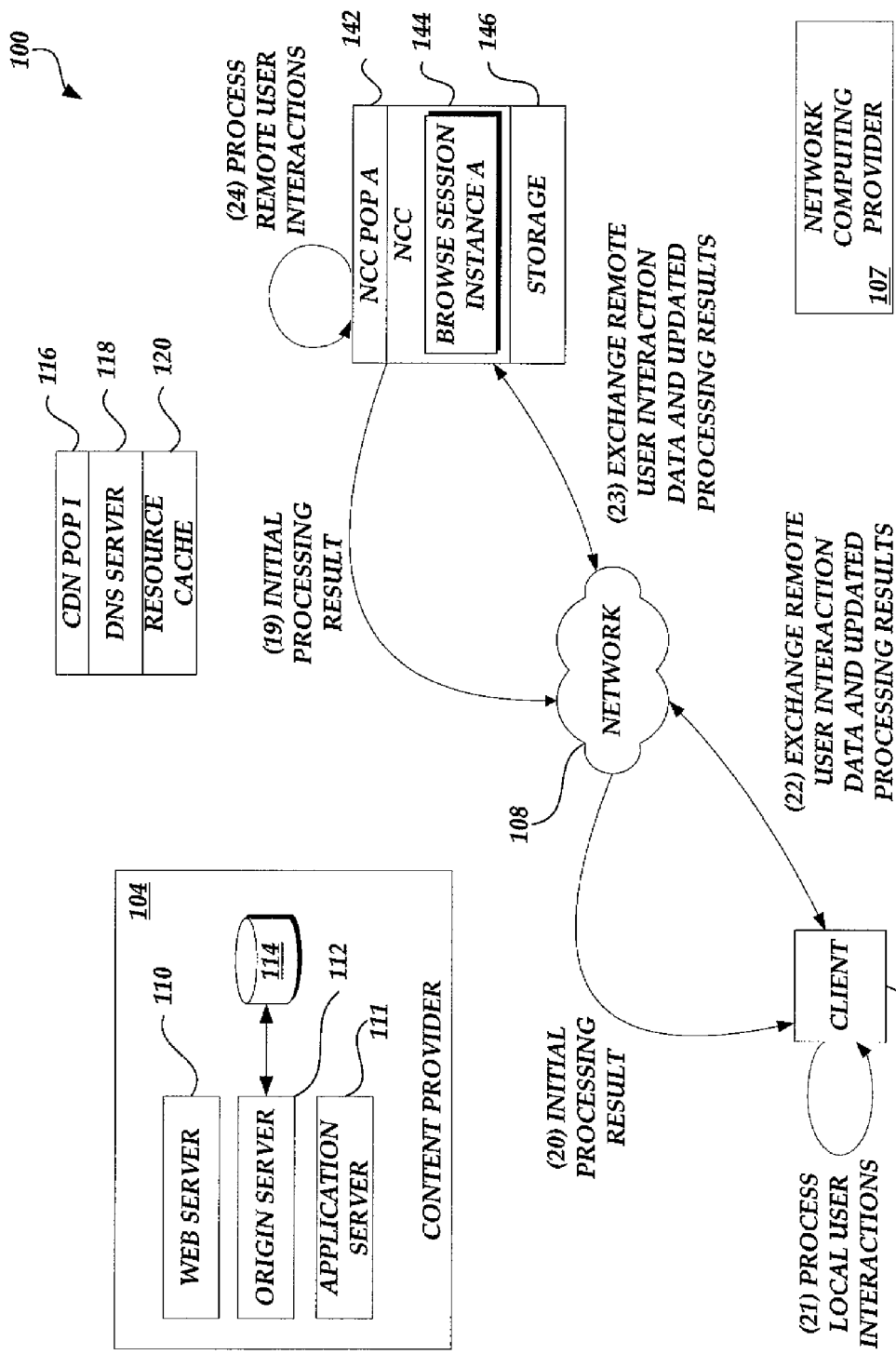
FIG. 5 is a block diagram of the content delivery environment of FIG. 1 illustrating the generation and processing of browse session data and user interaction data between a network computing provider and client computing device.

With reference to FIG. 5, an illustrative interaction for generation and processing of processing results and user interaction data between a network computing provider and client computing device is disclosed. As previously described, in one embodiment, the respective browsers on the instantiated network computing component and the client computing device 102 can exchange browsers' session information related to the allocation and processing of the requested resources at the instantiated network computing component and client computing device. As illustrated in FIG. 5, the selected NCC POP 142 may provide an initial processing result to the client computing device 102 over the network 108. The initial processing result may correspond to requested network content, such as a Web page, along with associated embedded resources processed by the NCC POP 142 in accordance with a selected remote session browsing configuration as described in FIG. 4 above. The NCC POP 142 also makes a determination of which additional processes will be conducted at the NCC POP 142, at the client computing device 102, or both. Subsequent to receiving an initial processing result and the allocation of processes, the client computing device 102 may perform any remaining processing actions on the initial processing result as required by the selected remote session browsing configuration, and may display the fully processed content in a content display area of a browser. The client computing device 102 may process any local user interactions with local interface components or content elements locally, and may provide user interactions requiring remote processing to the network computing provider 107. The network computing provider 107 may provide updated processing results to the client computing device in response to changes to the content or remote user interaction data from the client computing device.

Figure 6:
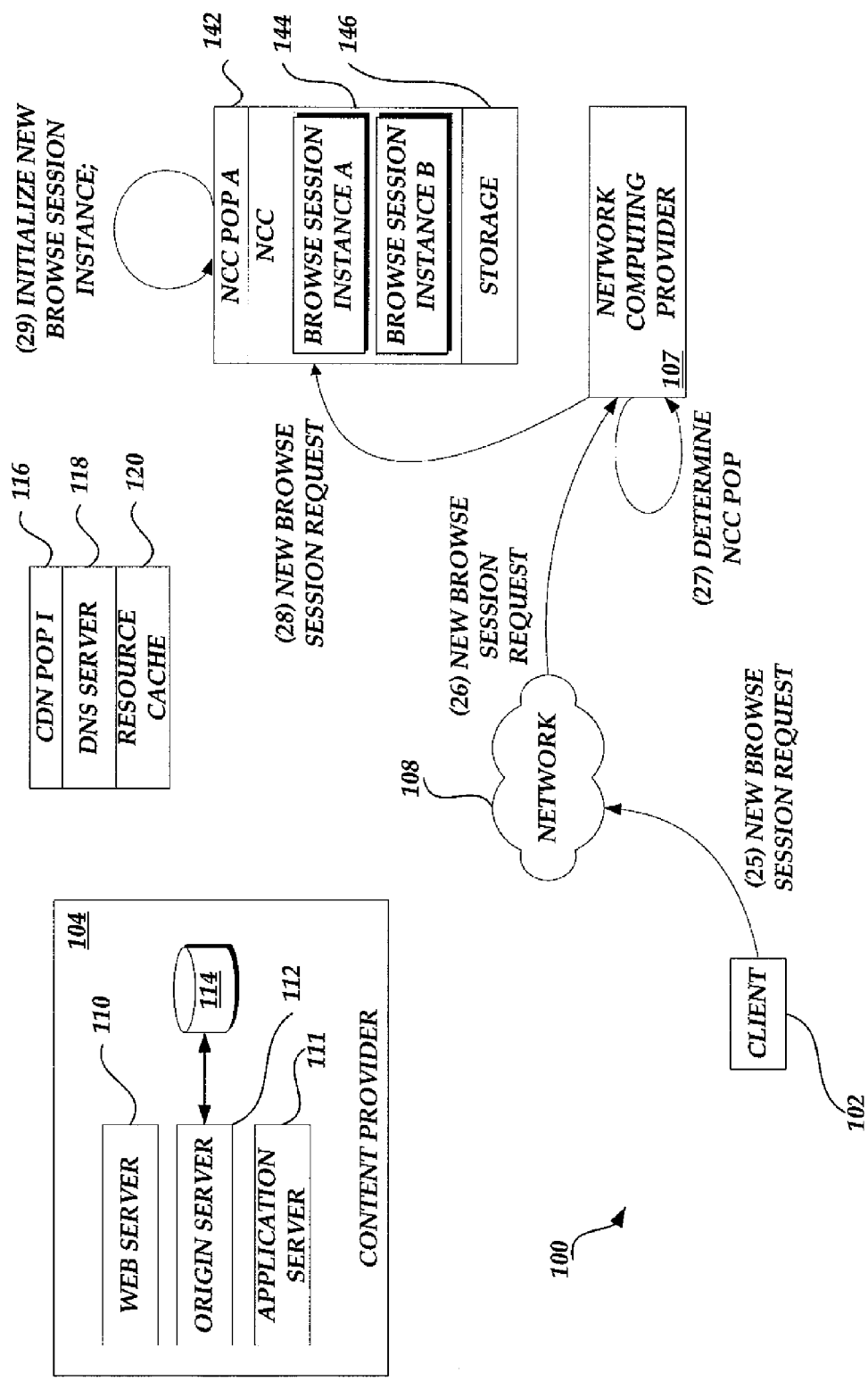
FIG. 6 is a block diagram of the content delivery environment of FIG. 1 illustrating the generation and processing of an additional new browse session request from a client computing device to a network computing provider.

With reference to FIG. 6, a block diagram of the content delivery environment of FIG. 1 illustrating the generation and processing of an additional new browse session request from a client computing device to a network computing provider is disclosed. As illustrated in FIG. 6, a second new browse session request may be sent to network computing provider 107 from client computing device 102 across network 108. In an illustrative embodiment, the network computing provider 107 utilizes a registration API to accept browse session requests from the client computing device 102.

The additional browse session request may be generated by a client computing device 102 in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), or any other user interaction. For example, a user browsing a first Web page corresponding to a first browse session instance may follow a link that opens a new tab or browser window to view a second Web page. In one embodiment, any required steps of obtaining and processing content associated with the second Web page may be performed by the currently instantiated network computing component in which the browser can handle the processing of both resource requests. In another embodiment, the client computing device 102 request may be processed as a new browse session request to the network computing provider 107, including the network address of the second Web page. In this embodiment, the browser on the client computing device may not specifically request a separate browse session, and a user's interaction with the browser on the client computing device 102 may appear to be part of a same browsing session. As described above with regard to FIGS. 2 and 3, the network computing provider 107 may cause an instantiation of a network computing component for obtaining and processing content associated with the second web page. In other embodiments, a new browse session request may be generated by the client computing device 102 corresponding to sections of a network resource (e.g., frames of a Web page), individual network resources, or embedded resources themselves, data objects included in a set of content, or individual network resources.

Illustratively, the additional browse session request may include any number of pieces of data or information including, but not limited to, information associated with a user, information associated with the client computing device 102 (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. Requested content may include any manner of digital content, including Web pages or other documents, text, images, video, audio, executable scripts or code, or any other type of digital resource.

Subsequent to the receipt of the browse session request, the network computing provider 107 may select an associated network computing component such as NCC POP 142 to service the browse session request. As discussed above with reference to FIG. 2, a network computing provider 107 may select an NCC POP to service a browse session request based on any number of factors, including, but not limited to available NCC POP resources (e.g., available memory, processor load, network load, etc.), a financial cost of servicing the browse session request at the NCC POP, the NCC POP location respective to a client computing device 102, content provider 112, or CDN POP 116, a NCC POP cache status (e.g., whether a requested resource is already stored in an NCC POP cache), etc. In one embodiment, the network computing provider 107 may select a number of NCC POPs to service a browse session request. Illustratively, although the network computing provider 107 is depicted here for purposes of illustration as selecting NCC POP 142, the network computing provider 107 may select any extant NCC POP to service the browse session request. For example, a single client computing device 102 may simultaneously or sequentially provide three different browse session requests to the network computing provider 107 corresponding to different network resources. The network computing provider 107 may select different NCC POPs for each browse session request, the same NCC POP for all three browse session requests, or any combination thereof. As discussed above, the decision whether to select a different NCC POP than was utilized for a previous or simultaneous browse session request may be made on the basis of available system resources, randomly, or according to any other factor as discussed above and with regards to FIG. 2.

Figure 7:
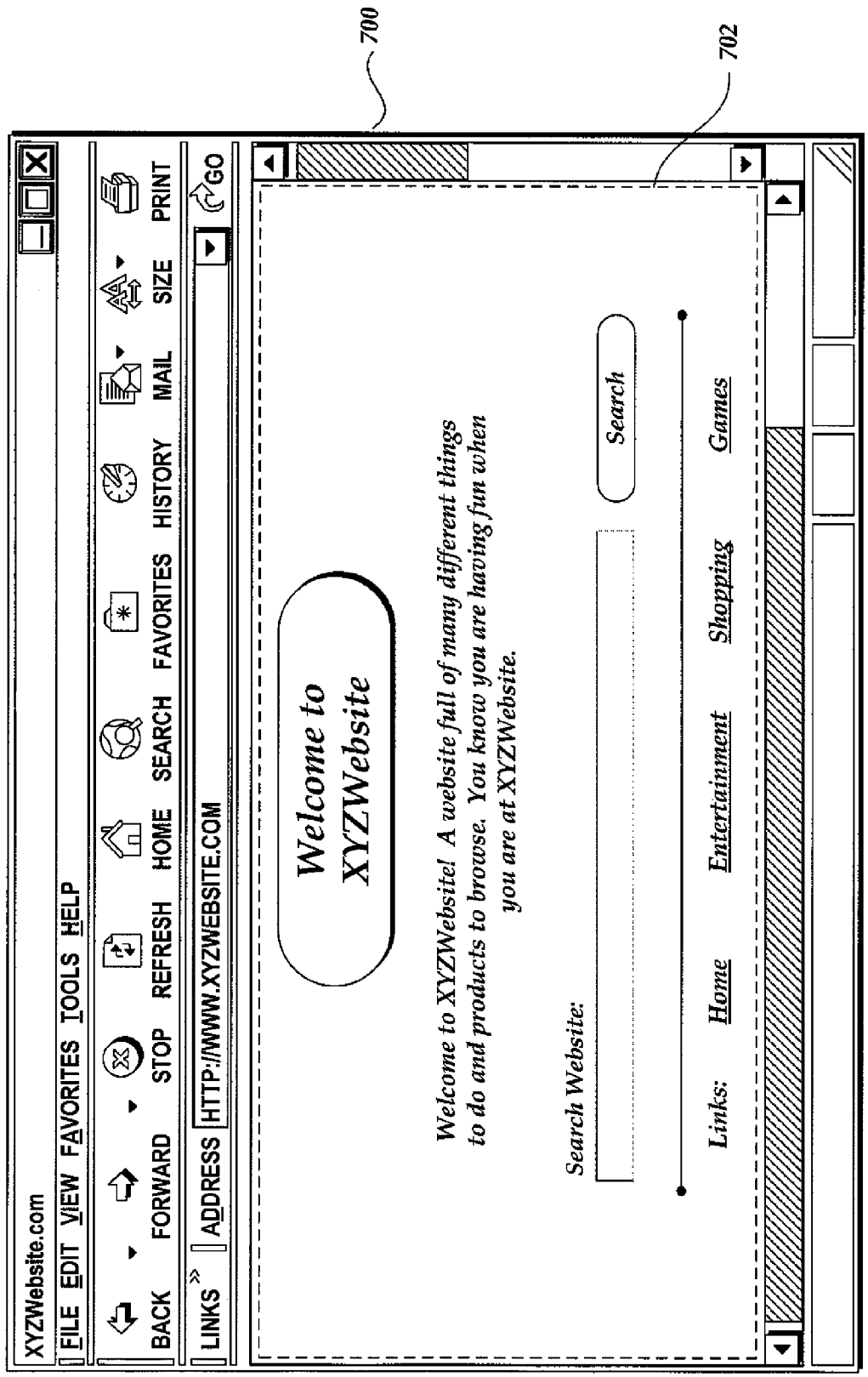
FIG. 7 is a user interface diagram depicting an illustrative browser interface and display of browse session content.

FIG. 7 is a user interface diagram depicting an illustrative browser interface and display of browse session content. As described above with reference to FIG. 5, a browser 700 may have a content display area 702, as well as one or more one or more local interface components. These local interface components may include toolbars, menus, buttons, address bars, scroll bars, window resize controls, or any other user interface controls. Illustratively, local interface components may be displayed as separate from the content display area or may be overlaid or embedded in the content display area.

Interactions with local interface components may be treated as local user interactions or remote user interactions depending on the processing required by the interaction and the remote session browsing configuration. For example, the selection of a preferences option in a browser menu may be handled entirely as a local user interaction by a browser. The processing required to display the menu, provide visual feedback regarding the selection, display the preferences window, and process the changes made to the browser preferences may be performed locally. As discussed above, processing user interactions locally may provide greater responsiveness at the browser as opposed to sending user interaction data to the NCC POP 142 for processing. As another example, when using a remote session browsing configuration that specifies extensive processing on the NCC POP 142 (e.g., a remote session browsing configuration using a remote session communication protocol such as RDP), the selection of a content refresh button in a browser toolbar may be handled both as a local user interaction and a remote user interaction. The limited processing required to provide interface feedback corresponding to the button selection may be handled at the client computing device 102 in order to provide the appearance of interface responsiveness, while the refresh command, which may require processing of the network content displayed in the content display area of the browser, may be sent as user interaction data to the NCC POP 142 for processing. The NCC POP 142 may then transmit updated processing results corresponding to the refreshed network content back to the client computing device 102 for display.

Figure 8:
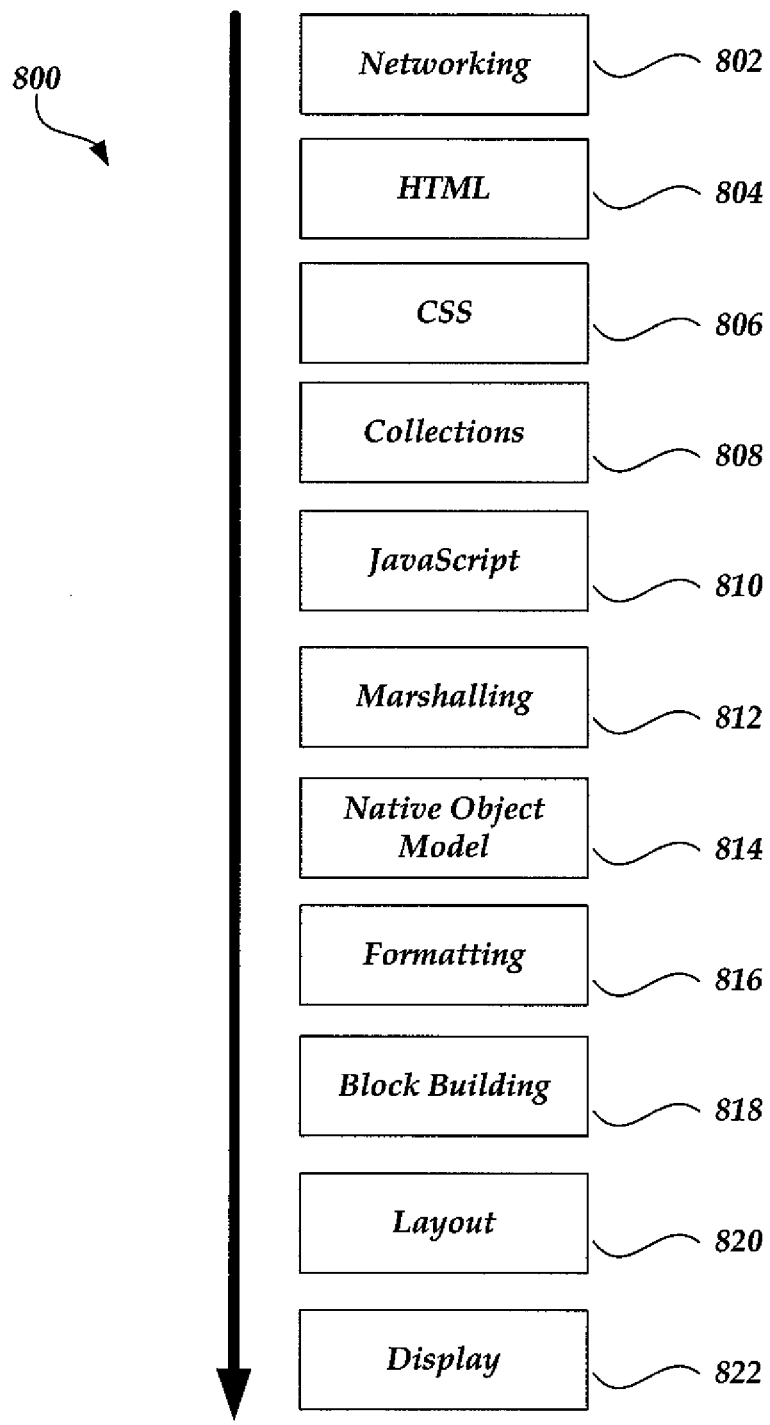
FIG. 8 is a diagram depicting illustrative browser content processing actions as a series of processing subsystems.

FIG. 8 is a diagram depicting illustrative browser content processing actions as a series of processing subsystems 800. In many embodiments, a browser may process sets of content (e.g., network resources such as web pages and associated embedded resources) in a series of processing actions. Illustratively, and as described above with reference to FIGS. 3-5, a remote session browsing configuration may specify a split between processing actions performed at a network computing provider (e.g., an NCC POP) and processing actions performed at a client computing device 102. This split may designate some processing actions to be performed by each of the NCC POP and client computing device 102, or may assign all processing actions to a single device or component. For example, an NCC POP may perform all of these various processing actions at the browse session instance, and send fully processed RDP processing results to the client computing device 102 for bitmap assembly and display. Any number of different remote session browsing configurations may be used by one or more browse sessions instances running at an NCC POP.

One of skill in the relevant art will appreciate that the subsystems shown here are depicted for the purpose of illustration, and are not intended to describe a necessary order or a definitive list of browser subsystems. Various browser software components may implement additional or fewer browser subsystems than are shown here, and may order the subsystems or corresponding processing actions in any number of different ways. Although the processing subsystems 800 depicted here for purposes of illustration are directed at the processing of Web pages or other Web content, one of skill in the relevant art will appreciate that the processing of other file types or network resources may be broken up in a similar manner. For example, one of skill in the relevant art will appreciate that a similar schema may be developed for the processing of images, video, audio, database information, 3d design data, or any other file format or type of data known in the art. Similar schema may also be developed for any number of device operating system or software framework processing operations, such as scheduling, memory or file management, system resource management, process or service execution or management, etc. Further, although the HTML protocol and RDP remote session communication protocols are discussed herein for the purposes of example, one of skill in the relevant art will appreciate that a remote session browsing configuration may implement any number of remote communication protocols for any number of specified processing actions, and that a remote session browsing configuration may be formulated to perform any fraction or combination of the actions identified below at any combination of the client computing device 102 and network computing provider 107.

Illustratively, the first processing subsystem involved in the processing and display of network content is the networking subsystem 802. Illustratively, the networking subsystem 802 may be responsible for all communication between the browser and content provider, including local caching of Web content. The networking subsystem is generally limited by the performance of the user's network. A remote session browsing configuration that splits processing actions at the networking subsystem 802 might include a remote session browsing configuration utilizing an HTML remote session communication protocol, where one or more caching or resource retrieval actions were performed at the NCC POP, but parsing and processing of the content was performed at the client computing device.

As network resources such as HTML documents are downloaded from the server they may be passed to an HTML subsystem 804 which parses the document, initiates additional downloads in the networking subsystem, and creates a structural representation of the document. Modern browsers may also contain related subsystems which are used for XHTML, XML and SVG documents. A remote session browsing configuration that splits processing actions at the HTML subsystem 804 might include a remote session browsing configuration utilizing an HTML remote session communication protocol, where an initial HTML page is processed at the NCC POP in order to extract embedded resource identifiers, but additional parsing and processing of the content is performed at the client computing device. In another embodiment, a remote session browsing configuration that splits processing actions at the HTML subsystem 804 might perform initial processing to create the structural representation of the HTML document, and provides a processing result including the structural representation and associated embedded resources to the client computing device for processing.

When CSS is encountered, whether inside an HTML document or an embedded CSS document, it may be passed to a CSS subsystem 806 to parse the style information and create a structural representation that can be referenced later. Illustratively, a remote session browsing configuration that splits processing actions at a CSS subsystem 806 may construct a processing result including the CSS structural representation and HTML structural representation, and provide the processing result and associated embedded resources to the client computing device for processing.

HTML documents often contain metadata, for example the information described in a document header or the attributes applied to an element. The collections subsystem 808 may be responsible for storing and accessing this metadata. A remote session browsing configuration that splits processing actions at a collections subsystem 808 may construct a processing result including processed metadata along with any other structural representations discussed above, and provide the processing result and associated embedded resources to the client computing device for processing.

When Javascript is encountered, it may be passed directly to a JavaScript subsystem 810 responsible for executing the script. The Javascript subsystem 810 has been examined fully over the years, and may be one of the most well-known browser subsystems in the art. A remote session browsing configuration that splits processing actions at a Javascript subsystem 810 may construct a processing result including an internal representation of one or more Javascript scripts, including, but not limited to state data or a representation of the script in a native or intermediate form, as well as any other processed structures or data discussed above, and provide the processing result and associated embedded resources to the client computing device for processing.

Because many JavaScript engines are not directly integrated into the browser, there may be a communication layer including the marshaling subsystem 812 between the browser and the script engine. Passing information through this communication layer may generally be referred to as marshaling. A remote session browsing configuration that splits processing actions at a marshaling subsystem 812 may construct a processing result including marshaling data as well as any other processed structures, scripts, or data discussed above, and provide the processing result and associated embedded resources to the client computing device for processing.

In some embodiments, JavaScript interacts with an underlying network resource such as a Web document through the Document Object Model APIs. These APIs may be provided through a native object model subsystem 814 that knows how to access and manipulate the document and is the primary interaction point between the script engine and the browser. Illustratively, a remote session browsing configuration that splits processing actions at a native object model subsystem 814 may construct a processing result including native object model state data or API calls as well as any other processed structures, scripts, or data discussed above, and provide the processing result and any other associated embedded resources to the client computing device for processing.

Once the document is constructed, the browser may needs to apply style information before it can be displayed to the user. The formatting subsystem 816 takes the HTML document and applies styles. Illustratively, a remote session browsing configuration that splits processing actions at a formatting subsystem 816 may construct a processing result including an HTML representation with applied styles, as well as any other processed state data, API calls, structures, scripts, or data discussed above, and provide the processing result and any other associated embedded resources to the client computing device for processing.

In one embodiment, CSS is a block based layout system. After the document is styled, the next step, at a block building subsystem 818, may be to construct rectangular blocks that will be displayed to the user. This process may determine things like the size of the blocks and may be tightly integrated with the next stage, layout. A remote session browsing configuration that splits processing actions at a block building subsystem 818 may construct a processing result including block information, as well as any other processed state data, API calls, structures, scripts, or data discussed above, and provide the processing result and any other associated embedded resources to the client computing device for processing.

Subsequent to the browser styling the content and constructing the blocks, it may go through the process of laying out the content. The layout subsystem 820 is responsible for this algorithmically complex process. Illustratively, a remote session browsing configuration that splits processing actions at a layout subsystem 820 may process the various state data, API calls, structures, scripts, or data discussed above to construct a processing result including layout information for the client computing device. Illustratively, an NCC POP may make use of various data or settings associated with the client computing device or browser (e.g., as provided in the initial browse session request) in order to generate a suitable layout for the client computing device. For example, a mobile device may provide a screen resolution and a display mode to the NCC POP. The NCC POP may base layout calculations on this screen resolution and display mode in order to generate a processing result corresponding to a content representation suitable for a browser running on the mobile device. Illustratively, in various embodiments, any other subsystem implemented by the NCC POP may make use of data associated with the client computing device or browser in generating a processing result for the client.

The final stage of the process may occur inside the display subsystem 822 where the final content is displayed to the user. This process is often referred to as drawing. A remote session browsing configuration that splits processing actions at the networking subsystem 802 might include a remote session browsing configuration utilizing an RDP remote session communication protocol, where nearly all processing is performed at the NCC POP, and a processing result including bitmap data and low level interface data are passed to the client computing device for display.

Figure 9:
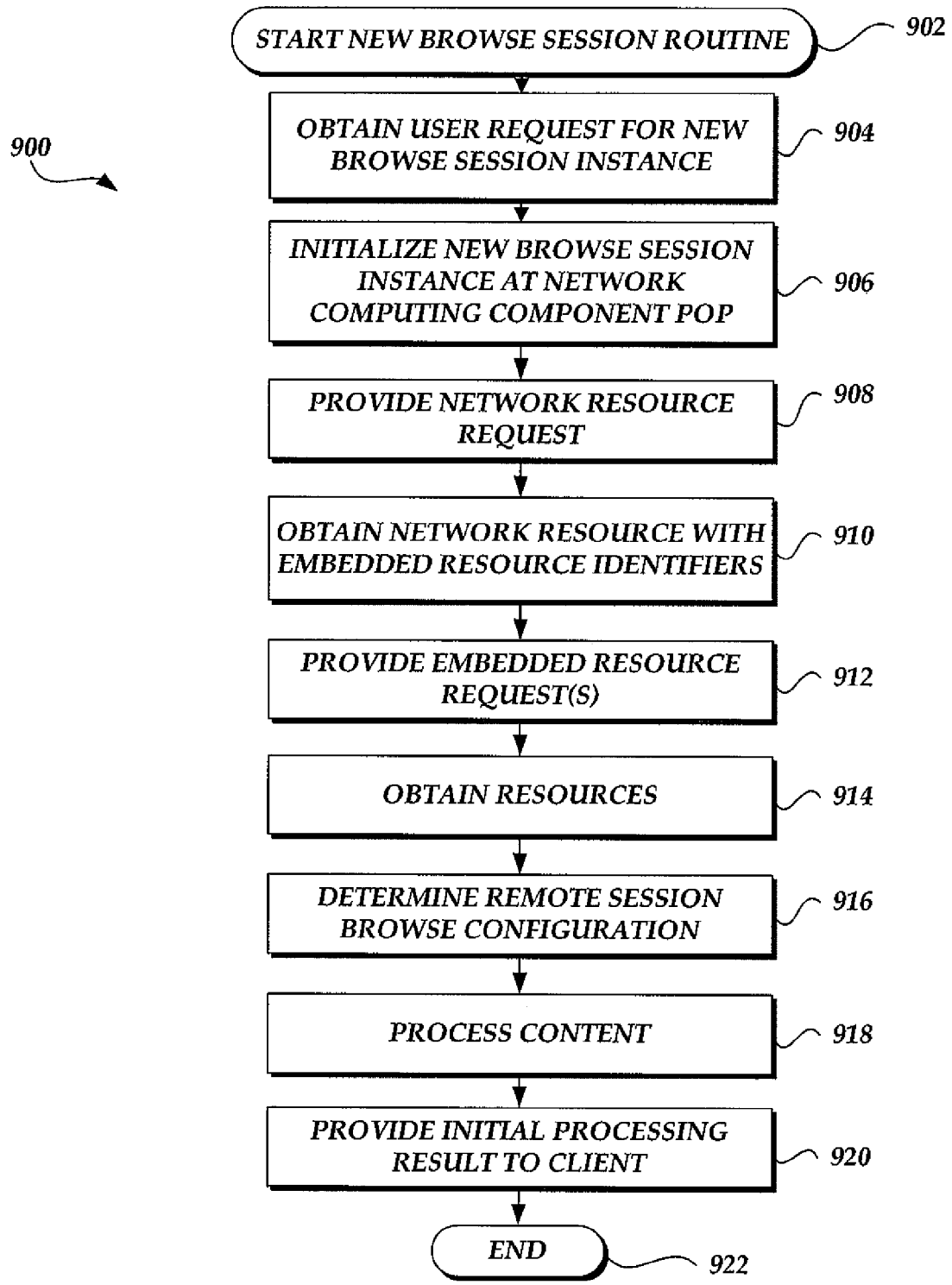
FIG. 9 is a flow diagram illustrative of a new browse session routine implemented by network computing provider.

FIG. 9 is a flow diagram illustrative of a new browse session routine 900 implemented by network computing provider 107 of FIG. 1. New browse session routine 900 begins at block 902. At block 904, the network computing provider 107 receives a new browse session request from client computing device 102. As previously described, the client computing device 102 may load a browser for viewing network content in response to an event or user request. Subsequent to the browser being loaded, the browser may be implemented request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. This browse session request may include one or more addresses or references to various network resources or other content requested by the client computing device 102. In an illustrative embodiment, the browse session request is transmitted in accordance with an API.

At block 906 the network computing provider 107 may select an associated NCC POP to instantiate a new browse session based on the browse session request. As discussed above with reference to FIG. 1, a network computing provider 107 may include any number of NCC POPs distributed across any number of physical or logical locations. A network computing provider 107 may select a NCC POP to service a browse session request based on any number of factors, including, but not limited to available NCC POP resources (e.g., available memory, processor load, network load, etc.), a financial cost of servicing the browse session request at the NCC POP, the NCC POP location respective to a client computing device 102, content provider 104, or CDN POP 116, a NCC POP cache status (e.g., whether a requested resource is already stored in an NCC POP cache), etc.

In one embodiment, the network computing provider 107 may select a number of NCC POPs to service a browse session request. For example, the network computing provider 107 may select two NCC POPs with different logical locations in the network. Each NCC POP may independently request and process network content on the behalf of the client computing device 102, and the client computing device 102 may accept data from the first NCC POP to return a processing result. Subsequent to being selected by the network computing provider 107, NCC POP 142 may obtain the browse session request. In one embodiment, NCC POP 142 may have the browse session request forwarded to it by a component of network computing provider 107. In another embodiment, NCC POP 142 or client computing device 102 may receive connection information allowing the establishment of direct communication between NCC POP 142 and client computing device 102. Illustratively, NCC POP 142 may be provided with the browse session request originally provided to network computing provider 107, may be provided with a subset of information (e.g., just a network address of requested content), or may be provided additional information not included in the original browse session request.

Subsequent to the NCC POP 142 being selected, the network computing provider 107 may cause the NCC POP 142 to instantiate a new browse session. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session. Illustratively, one or more characteristics of the new browse session instance and/or browser instance may be based on client computing device 102 information included in the browse session request. For example, the browse session request may include a device type or browser type, a device screen resolution, a browser display area, or other information defining the display preferences or capabilities of the client computing device 102 or browser. The NCC POP 142 may accordingly instantiate a virtual machine instance and/or a browser instance with the same or similar capabilities as the client computing device 102. Illustratively, maintaining a virtual machine instance and/or browser with the same or similar capabilities as the client computing device 102 may allow the NCC POP 142 to process network content according to the appropriate dimensions and layout for display on the particular client computing device 102.

In some embodiments, the NCC POP 142 may utilize an existing virtual machine instance and/or browser instance in addition to, or as an alternative to, instating a new browse session. For example, subsequent to the NCC POP 142 being selected, the network computing provider 107 may cause the NCC POP 142 to associate an existing browser instance and/or virtual machine instance, such as one or more instances previously instantiated at the NCC POP 142, with the new browse session request. Illustratively, an existing browser session and/or virtual machine instance may correspond to another browse session, remote application session, or other remote process associated with the user or client computing device 102, or may be a previously instantiated software instance from an unrelated browse session or remote process. In other embodiments, the NCC POP 142 may instantiate a new browser or other application process in an existing virtual machine instance, or may combine the utilization of previously instantiated and newly instantiated software processes in any number of other ways. In still further embodiments, the network computing provider or NCC POP 142 may instantiate any number of new virtual machine instances and/or browser instances (or make use of existing instantiated instances) based on a single browse session request.

At block 908 the network computing provider 107 may provide a request for one or more network resources to a content provider or CDN service provider based on a network address included in the browse session request. In various embodiments, one or more network resources may be additionally or alternately retrieved from a cache local to the NCC POP 142 or otherwise associated with the network computing provider 107. One of skill in the art will appreciate that, in the case of other embodiments, the link or network address may correspond to a document or file stored in a digital file locker or other network storage location or at a cache component associated with the network computing provider 107 or client computing device 102. In some embodiments, the new session request may include a document or file in addition to or as an alternative to a network address. At block 910, the network computing provider 107 obtains the one or more network resources. Subsequent to obtaining the requested network resource, the NCC POP 142 may process the network resource to extract embedded resource identifiers.

At block 912, the network computing provider 107 may provide resource requests to one or more sources of content such as content providers, CDN service providers, and caches. The resource requests may correspond to embedded resources based on the one or more embedded resource identifiers extracted from the one or more network resource as described in block 910 above. At block 914, the network computing provider 107 may obtain these embedded resources from any number of different sources, sequentially or in parallel.

At block 916, the network computing provider 107 may process the one or more network resources and associated embedded resources to determine a remote session browsing configuration for the processing and communication of content to the client computing device 102. A remote session browsing configuration may include any proprietary or public remote protocol allowing exchange of data and user interactions or requests between a client and a remote server. The remote session browsing configuration may illustratively include both a remote session communication protocol and a processing schema for providing processed (or unprocessed) content to a client computing device for display in the content display area of a browser.

Illustratively, a remote session browsing configuration may define or specify a remote session communication protocol, including, but not limited to, a network protocol, signaling model, transport mechanism, or encapsulation format for the exchange of state data, user interactions, and other data and content between the network computing provider and the client computing device. Examples of remote session communication protocols known in the art include Remote Desktop Protocol (RDP), X-Windows protocol, Virtual Network Computing (VNC) protocol, Remote Frame Buffer protocol, HTML, etc. For example, RDP illustratively specifies a number of processing mechanisms for encoding client input (e.g., mouse movement, keyboard input, etc.) into protocol data units for provision to a remote computing device, and corresponding mechanisms for sending bitmap updates and low level interface information back to the client device. As another example, the HTML protocol illustratively provides a mechanism for providing files defining interface information and containing resources references from a server to a client, and a corresponding mechanism for a client computing device to provide requests for additional files and resources to the server. In one embodiment, the NCC POP 142 may provide an initial communication to the client computing device 102 after determining the remote session communication protocol. This initial communication may allow the client computing device 102 to prepare to receive communications in the selected remote session communication protocol, and, in the case of pull remote session communication protocols like HTTP, may cause the client computing device to send an initial resource request to the browse session instance running on the NCC POP 142.

Each remote session browsing configuration may additionally define a split of processing actions between the network computing service (e.g., NCC POP 142) and the client computing device (e.g., client computing device 102). In one embodiment, a particular split of processing actions may be based on or mandated by a particular remote session communication protocol. In another embodiment, a remote session communication protocol may allow several different splits of processing actions depending on the implementation or configuration of the protocol. For the purpose of illustration, many pieces of network content (e.g., Web pages, video, Flash documents) may require various processing actions before being displayed on a computing device. A Web page, for example, may be parsed to process various HTML layout information and references to associated resources or embedded content such as CSS style sheets and Javascript, as well as embedded content objects such as images, video, audio, etc. The HTML and each referenced object or piece of code will typically be parsed and processed before a representative object model corresponding to the Web page may be constructed. This object model may then be processed further for layout and display in a content display area of a browser at the client computing device 102. Illustrative browser processing actions are described in greater detail below with reference to FIG. 8. One of skill in the art will appreciate that, in the case of other embodiments or applications, various other processing actions may be required.

A remote session browsing configuration may specify that several of the processing actions required for display of piece of network content be performed at the remote computing device, such as the NCC POP 142, rather than at the client computing device 102. Network content partially (or wholly) processed at the network computing provider may be referred to as a processing result. As discussed below, the split of processing actions may be associated with or linked to the remote session communication protocol used for exchanging data and client input between the NCC POP 142 and client computing device 102.

For example, a remote session communication protocol such as RDP that transmits a processing result including low level interface information and bitmaps to the client computing device 142 for display may be associated with a remote session browsing configuration that specifies performing all, or nearly all, of the necessary content processing actions at the NCC POP 142. While using RDP, the NCC POP 142 may, for example, run a full instance of a browser the NCC POP 142 and transmit a processing result consisting of bitmap updates corresponding to a representation of the displayed content to the client computing device 102. The client computing device 102, in this example, may merely be required to assemble the transmitted bitmap updates for display in the content display area of the browser, and may perform none of the processing of the actual HTML, Javascript, or data objects involved in the display of an illustrative piece of network content. As another example, a remote session browsing configuration utilizing a remote session communication protocol such as HTML may transmit network content in a largely unprocessed form. The client computing device 102 may thus perform all of the processing actions required for display of network content while the NCC POP 142 performs little or no processing.

The NCC POP 142 may base its determination of a remote session browsing configuration on any number of factors, including, but not limited to, one or more characteristics of one or more of the requested resources, content provider 104, or CDN service provider 106, one or more characteristics of the content address or domain, one or more characteristics of the client computing device 102, browser or application, user, one or more characteristics of the NCC POP 142, or one or more characteristics of the network or network connection, etc. Characteristics of requested resources may include, but are not limited to, a data format, a content type, a size, processing requirements, resource latency requirements, a number or type of interactive elements, a security risk, an associated user preference, a network address, a network domain, an associated content provider, etc. Characteristics of a content provider 104, CDN service provider 106, computing device 102, or NCC POP 142 may include, but are not limited to, processing power, memory, storage, network connectivity (e.g., available bandwidth or latency), a physical or logical location, predicted stability or risk of failure, a software or hardware profile, available resources (e.g., available memory or processing, or the number of concurrently open software applications), etc. The NCC POP 142 may further consider perceived security threats or risks associated with a piece of content or domain, preferences of a client computing device or a content provider, computing or network resource costs (e.g., a financial cost of processing or bandwidth, resource usage, etc.), predetermined preferences or selection information, any additional processing overhead required by a particular remote session browsing configuration, a cache status (e.g., whether a particular resources is cached at a NCC POP 142, at the client computing device 102, or at other network storage associated with the network computing provider), a predicted delay or time required to retrieve requested network content, a preferred content provider or agreements with a content provider for a particular remote session browsing configuration or level of service, a remote session browsing configuration being used for another (or the current) browse session by the same user, or any other factor.

In some embodiments, an NCC POP 142 may base a determination of a remote session browsing configuration on past behavior or practice. For example, an NCC POP 142 that has determined a remote browse session configuration for a particular resource in the past may automatically select the same remote browse session configuration when the resource is requested by the same (or potentially a different) user. As another example, a user that has a history of frequently accessing Web sites with extensive processing requirements may automatically be assigned a remote session browsing configuration that performs the majority of processing at the NCC POP 142. In other embodiments, an NCC POP 142 may base a determination of a remote browse session configuration on predictions of future behavior. For example, an NCC POP 142 may base its determination of a remote browse session configuration for a particular resource on an analysis of past determinations made for a particular Web site, network domain, or set of related resources. A content provider that historically has provided video-heavy Web pages may be associated with a remote session browsing configuration that emphasizes video performance at the client computing device 102. Illustratively, past historical analysis and future predictions may be considered as one or more of a number of factors on which to base the remote session browsing configuration determination process, or may be definitive in the decision making process. For example, once an NCC POP 142 determines a remote session browsing configuration for a particular content provider, it may skip the remote session browsing configuration determination process for any future resources served from the content provider. Illustratively, the NCC POP 142 may re-determine a remote session browsing configuration to be associated with the content provider after a fixed period of time or after the NCC POP 142 has identified or determined a change in the content being served by the content provider.

In other embodiments, a network resource, Web site, network domain, content provider, or other network entity may specify or otherwise request the use of a particular remote browse session configuration in a resource tag, metadata, or other communication with an NCC POP 142. The NCC POP 142 may treat the request as definitive, or may consider the request as one of multiple factors to be considered in the decision making process.

For example, a remote session browsing configuration utilizing a remote session communication protocol such as RDP may specify extensive processing to occur at the network computing provider 107 (e.g., at NCC POP 142) rather than at the client computing device 102. The remote session browsing configuration may thus leverage the processing power of the NCC POP 142 to achieve lower latencies and presentation delay when dealing with network content that requires a great deal of pre-processing (e.g., content with a great deal of CSS or Javascript information defining page layout). The NCC POP 142 may therefore select a remote session browsing configuration that performs a substantial amount of processing at the network computing provider 107 and utilizes RDP or a similar remote session communication protocol for communication of processing-intensive content. Conversely, a remote session browsing configuration that utilizes a remote session communication protocol such as HTML may specify extensive processing at the client computing device 102 rather than at the network computing provider 107. The remote session communication protocol may thus achieve smaller delays and smoother presentation when presented with simple network content that requires very little processing or network content that requires rapid change in displayed content after its initial load. For example, a Web page with embedded video may perform better performing the majority of processing locally and utilizing HTML rather than RDP as a remote session communication protocol. A remote session browsing configuration specifying extensive processing at the network computing provider 107 must process the video at the NCC POP 142 and rapidly send screen updates (e.g. by RDP) to the client computing device 102, potentially requiring a great deal of bandwidth and causing choppy playback in the browser, while a remote session browsing configuration specifying local processing may provide raw video information directly to the client computing device 102 for display (e.g. by HTML), allowing for client side caching and a smoother playback of content.

As a further example, the NCC POP 142 in communication with a client computing device 102 with extremely limited processing power may elect to use a remote session browsing configuration that requires very little processing by the client computing device, for example, using RDP to transmit NCC POP 142 processed results. Conversely, an NCC POP 142 providing an extremely interactive Web page may elect to use a remote session browsing configuration that allows the client computing device 102 to handle user interactions locally in order to preserve interface responsiveness, for example, using HTML to transmit substantially unprocessed data. As a still further example, a NCC POP 142 may base the determination of a remote session browse configuration on preferences provided by the client computing device 102. A client computing device 102 may illustratively include preferences for a remote session browse configuration in an initial browse session request, or at any other time. The NCC POP 142 may utilize these preferences as an alternative to, or in addition to any other factor or decision metric. Illustratively, allowing the client computing device 102 to set or influence the selection of a remote session browse configuration allows the NCC POP 142 to take user preferences in account when determining a remote session browse configuration. For example, a user worried about initial page load times may prefer to use a remote session browsing configuration heavy on remote processing and utilizing an RDP remote session communications protocol, while a user wishing to maintain an extremely responsive interface may prefer using a remote session browsing configuration that performs the majority of the processing on the client computing device 102, for example, using an HTML remote session communication protocol.

Illustratively, the NCC POP 142 may base a determination of a remote browsing configuration on any factor or combination of factors. For example, the NCC POP 142 may select a remote session browsing configuration based on a single factor, or may assign weights to one or more factors in making a determination. In some embodiments, the determination process of the NCC POP 142 may change based on one or more factors described above. For example, an NCC POP 142 communicating with a client computing device 102 over a network with a surplus of unused bandwidth may give a low weight to factors such as the network requirements of a remote browse session, and may give a higher weight to factors such as the latency of page interactions, while an NCC POP 142 communicating with a client computing device 102 over a limited bandwidth network may give a higher weight to factors dealing with the efficiency of the remote session browse protocol over a network.

In one embodiment, the NCC POP 142 may select a single remote session browsing configuration for a set of network content. For example, the NCC POP 142 may select a single remote session browsing configuration for a requested network resource such as a Web page. The NCC POP 142 may thus process the Web page together with all embedded content based on the selected remote browsing session protocol, and utilize the remote browsing session protocol to exchange user interaction data and updated browse session data for all embedded content associated with the Web page. In another embodiment, the NCC POP 142 may select different remote session browsing configurations for one or more resources in a set of network content. For example, a network resource such as a Web page may reference processing intensive embedded Javascript or CSS resources, as well as embedded video resources. The NCC POP 142 may select a first remote session browsing configuration for the Web page and all embedded resources excluding the embedded video resource, and a second remote session browsing configuration for the embedded video resource. Illustratively, this may result in the NCC POP 142 utilizing RDP to send a processing result to the client computing device 102 for display of the Web page and associated embedded resources, while utilizing HTTP to send the embedded video as a separate, unprocessed file. In one embodiment, the client computing device 102 may perform the minimal processing required to display the RDP processing result corresponding to the Web page and embedded resources, and may also perform additional processing necessary to display the embedded video, for example, overlaying the video on top of the displayed RDP representation of the Web page. Any number of remote session browsing configurations may be selected to correspond to any number of resources or objects included in a set of network content, regardless of whether resources or objects are obtained from a content provider 104 or CDN service provider 106 in one or more logical files or data structures.

Although the selection of a remote session browsing configuration is illustratively depicted herein as occurring after all network resources and associated embedded content have been obtained by the NCC POP 142, one skilled in the relevant art will appreciate that the selection of a remote session browsing configuration may be performed at any time. For example, the NCC POP 142 may select a remote session browsing configuration after receiving a new browse session request or related information from the client computing device, may select a remote session browsing configuration after obtaining a network resource, but before obtaining any associated embedded resources, or at any other time. In some embodiments, the NCC POP 142 may switch to a new remote session browsing configuration at some time subsequent to the client computing device 102 obtaining an initial processing result. Illustratively, the NCC POP 142 selecting a new remote session browsing configuration may occur automatically after a certain time period or event or in response to a change in network conditions, NCC POP 142 or client computing device 102 load or computing resources, or any other factor described above as potentially influencing the choice of remote session browsing configuration. Illustratively, an NCC POP 142 dealing with other types or formats of information may select a remote session protocol based on any number of similar factors. For example, one of skill in the relevant art will appreciate that a similar schema may be developed for the processing of images, video, audio, database information, 3d design data, or any other file format or type of data known in the art.

The client computing device 102 may, in various embodiments, further instantiate a parallel browsing process sequentially or simultaneously with the request for a remote browse session. In one embodiment, a client computing device 102 may instantiate a traditional local browse session as known in the art (e.g., providing content requests from the browser and processing obtained resources locally) in addition to one or more remote browse instance executing at an NCC POP 142. In another embodiment, a client computing device 102 may be provided with unprocessed network resources by the NCC POP 142. Illustratively, the network resources may have been retrieved from one or more content providers, CDNs, or cache components by the NCC POP 142. The resources may be provided to the client computing device 102 to process locally in parallel with the remote browse instance executing at the NCC POP 142. In still further embodiments, the network computing provider or NCC POP 142 may instantiate any number of new virtual machine instances and/or browser instances (or make use of existing instantiated instances) to process resources and/or send processing results to the client computing device 102 in parallel. Illustratively, the local browse session at the client computing device 102 and the remote browse session instance at the NCC POP 142 may execute in parallel.

In one embodiment, a local browse session executing at the client computing device 102 may obtain unprocessed content (e.g., html Web pages, embedded content, and other network resources) from the NCC POP 142 responsive to a browse session request. Illustratively, the content may have been retrieved by the NCC POP 142 from a content provider, CDN, or cache in response to the browse session request. The unprocessed content provided by the NCC POP 142 may include all the content associated with the browse session request or may supplement content existing in a cache of the client computing device, retrieved from a content provider or CDN, or obtained from some other source. In one embodiment, a client computing device 102 may obtain all requested content from a local cache, and may not obtain any unprocessed resources or content from the NCC POP 142. Subsequent to obtaining the unprocessed content, client computing device 102 may process the requested content in parallel with a remote browse session executing at the NCC POP 142. For example, as the local browse session executing at the client computing device 102 is processing the requested content, a remote browse session executing at the NCC POP 142 may be processing the same content at substantially the same time. Once the NCC POP 142 has performed a set of processing actions on the content to generate a processing result (e.g., as specified by a determined remote session browsing configuration), the NCC POP 142 may provide the processing result to the client computing device 102.

For the purpose of illustration, a client computing device 102 may require a longer load time to obtain and process requested network resources than a browse session instance running at the NCC POP 142. For example, the NCC POP 142 may obtain and process content quickly due to its position on the network and the relative processing power of the local client computing device as compared to the NCC POP 142. Even if the NCC POP 142 provides the client computing device 102 with all requested network content, the client computing device 102 may still obtain a processing result from NCC POP 142 before the local browse session has fully completed processing the requested resources. The client computing device 102 may complete any further processing steps and display the obtained processing result before completing local processing and display of the content. Illustratively, this may allow the client computing device 102 to take advantage of an NCC POP 142's quicker content load time relative to a traditional local browse session. Prior to the local browse session completing the processing all requested resources, the browser may process any user interactions locally and/or remotely as described in FIGS. 5 and 11 below.

Once the local browse session has fully obtained and processed resources corresponding to the requested content, the computing device 102 may determine whether to continue to display results obtained from the NCC POP 142 (and process user interactions at the NCC POP 142) using the determined remote session browsing configuration or switch to processing user interactions locally. Switching to process user interactions locally may include replacing a displayed representation of the requested resources based on a processing result obtained from the NCC POP 142 with a local display of the requested resources. For example, a browser may display a representation of a Web page corresponding to a processing result from the NCC POP 142 (e.g., RDP display information representing the rendered page) until the browser is finished processing and rendering the Web page locally. The browser may then replace the representation from the NCC POP 142 with the locally rendered representation of the Web page. Illustratively, replacing one representation with another representation may be transparent to the user. For example, the local and NCC POP 142 representations of the Web page may be identical or substantially identical. In one embodiment, when the NCC POP 142 representation of the web page is displayed, the browser may send various user interactions with the displayed page to the NCC POP 142 for processing. When the locally rendered version of the Web page is displayed, user interactions may be processed locally at the browser. Illustratively, the determination of which representation of the requested resources to display (e.g., local or from the NCC POP 142) may be based on any of the same factors described with reference to determining a remote session browse protocol in above.

In one embodiment, the client computing device 102 may switch to processing user interactions locally as soon as local resources are fully loaded. Illustratively, the remote browse session instance running at the NCC POP 142 may be terminated after switching to local processing, or the remote browse session instance may be maintained as a backup in case of unresponsiveness or a failure with regards to the local browse session. For example, the client computing device 102 may process user interactions locally, as well as sending remote user interaction data to the NCC POP 142 in accordance with the selected remote session browsing configuration. The remote user interaction data may be used by the NCC POP 142 to keep the remote browse session instance fully in parallel with the local browse process being executed by the browser at the client computing device 102. As long as the local browse session continues to handle user interactions, the NCC POP 142 may either refrain from sending updated processing results, or may send updated processing results ignored by the client computing device 102. If a problem develops with the local browse session at the client computing device 102, updated processing results may be provided to the client computing device 102 from the NCC POP 142 for processing and display in lieu of the local browse session. Illustratively, this switch from the local browse session to remote processing may be transparent to the user. In some embodiments, the client computing device 102 may switch from a local browse session to a remote browse session instance based on factors other than unresponsiveness or failure at the local browser. For example, the client computing device 102 or network computing component 107 may select between a remote and local browse session based on any of the factors enumerated with regards to determining a remote session browse protocol above In another embodiment, the client computing device 102 may continue to process and display updated processing results from the NCC POP 142 even after the local browse session has fully loaded the requested content. The client computing device 102 may terminate the local browse session or may run the local browse session in parallel as a backup process in the converse of the example provided above. It should be appreciated that although the local browse session is described here for the purpose of illustration as being slower to load than the remote browse session instance, in some embodiments the local browse session may load the content faster than the remote browsing session, in which case the browser may process user interactions locally until the remote browse process has fully loaded the requested content. In some embodiments, the client computing device 102 may display and process user interactions through whichever browse session, local or remote, loads the requested content first.

In various other embodiments, the network computing provider 107 may instantiate multiple remote browse session instances to run in parallel in addition to or as an alternative to instantiating a local browse session. Illustratively, these parallel browse session instances may utilize any of the same or different remote session browse protocols, and may act as backups in the manner described above with regard to a local browse session, or may be used and switched between as alternatives in order to maximize browser performance at the client computing device 102. For example, in response to one or more browse session requests, the network computing provider 107 may instantiate a browse session instance running on a first NCC POP and utilizing an RDP protocol as well as browse session instance running on a second NCC POP utilizing an X-Windows protocol. The client computing device 102 or the network computing provider 107 may determine which browse session instance and protocol should be used based on performance or resource usage considerations as described with regards to determining a remote session browse protocol above.

With continued reference to FIG. 9, at block 918, the network computing provider 107 may process the obtained content, including the one or more requested network resources and embedded network resources, according to the determined remote session browsing configuration to generate an initial processing result. At block 920, the network computing provider 107 may provide the initial processing result to the client for further processing and display in the content display area of the browser. For the purposes of further example, an illustrative client new browse session interaction routine 1000 implemented by client computing device 102 is described below with reference to FIG. 10. At block 922, the start new browse session routine 900 ends.

Figure 10:
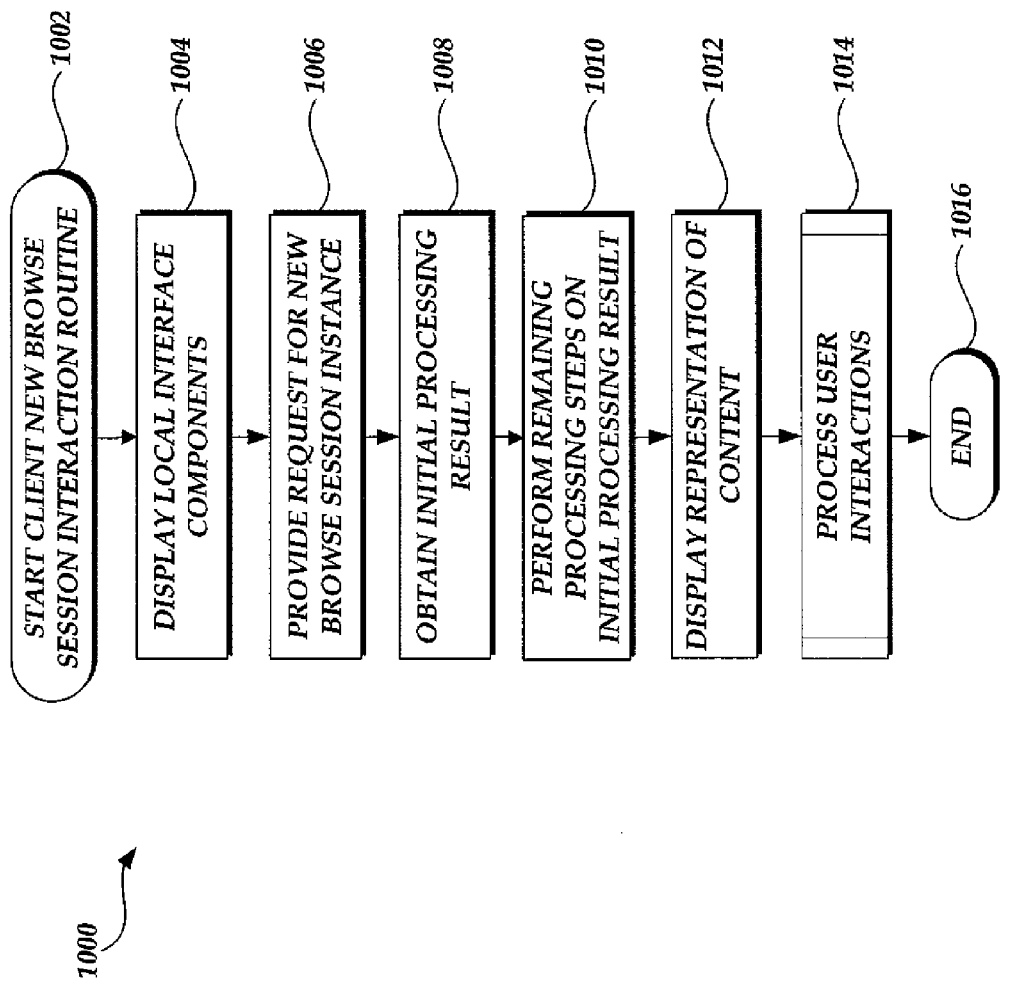
FIG. 10 is a flow diagram illustrative of a client new browse session interaction routine implemented by a client computing device.

FIG. 10 is a flow diagram illustrative of a client new browse session interaction routine 1000 implemented by client computing device 102. New browse session interaction routine 1000 begins at block 1002 in response to an event or user request causing the client computing device 102 to load a browser for viewing network content. At block 1004, the client computing device loads locally managed components of the browser, including all local interface components. As described above with reference to FIGS. 5 and 7, local interface components may include toolbars, menus, buttons, or other user interface controls managed and controlled by the software browser application or any other process executing or implemented locally at the client computing device. At block 1006, the client computing device 102 provides a request for a new browse session instance to the network computing provider 107. From the perspective of the user of the client computing device, the request for the new browse session corresponds to the intended request to transmit the request to one or more corresponding content providers 104. In other embodiment, the new session request may correspond to a request to load a file or other document (e.g., a request to load an image in a photo-editing application, etc.). Illustratively, the request may be generated automatically as a result of the browser loading (e.g., a request for a default or "home" page), or may be generated as a result of a user following a link or entering a network address into an address bar. As illustrated with respect to FIG. 2, the browse session request is transmitted first to a network computing provider 107. In an illustrative embodiment, the network computing provider 107 utilizes a registration API to accept browse session requests from the client computing device 102.

A browse session request may include any number of pieces of data or information including, but not limited to, information associated with a user, information associated with the client computing device 102 or software on the client computing device (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. For example, a browse session request from the client computing device 102 may include information identifying a particular client computing device hardware specification or a hardware performance level, latency and bandwidth data associated with recent content requests, a desired security level for processing different types of content, a predetermined preference list of remote session browse protocols, and one or more network addresses corresponding to requested network resources, among others. In another example, the browse session request can include information identifying a client computing device 102 screen resolution, aspect ratio, or browser display area in the browse session request may allow the network computing provider 107 to customize the processing of network content for display on the client computing device. As previously described, the browse session request can include network address information corresponding to a requested network resource, which may be in any form including, but not limited to, an Internet Protocol ("IP") address, a URL, a Media Access Control ("MAC") address, etc. In one embodiment, the request for a new browse session instance may correspond to the network computing provider receiving a request for a new browse session instance at block 904 of FIG. 9 above.

At block 1008, the client computing device 102 obtains an initial processing result from the network computing provider 107. Illustratively, the format and data included in the initial processing result may vary based on the remote session browsing configuration selected by the network computing provider 107. In one embodiment, the initial processing result may include or be preceded by data informing the client computing device 102 of the choice of remote session browsing configuration and/or establishing a connection over the remote session communication protocol corresponding to the selected remote session browsing configuration. As discussed above with reference to FIGS. 8 and 9, the obtained initial processing result may include requested content with one or more processing actions performed by the network computing provider 107. Subsequent to obtaining the initial processing result, the client computing device 102 may perform any remaining processing actions on the initial processing result at block 1010.

At block 1012, the client computing device 102 displays the content corresponding to the processed initial processing result. For example, the client computing device 102 may display the processed client in the content display area 702 of a browser 700 as described in FIG. 7 above. In one embodiment, the processing result may only include display data corresponding to content displayed by a browser, and may not include display data corresponding to, for example, the interface controls of a browser instance at the NCC POP 142, the desktop of a virtual machine instance corresponding to the browse session, or any other user interface of the NCC POP 142. For example, the NCC POP 142 may process a Web page and associated content for display via RDP in a browser instance running in a virtual machine instance at the NCC POP 142. The browser instance may have one or more interface elements such as toolbars, menus, scroll bars, etc., in addition to the displayed Web page. The NCC POP 142 may send an RDP processing result corresponding to the displayed Web page only, without any of the interface elements associated with the browser. Illustratively, including an RDP processing result corresponding to the displayed Web page only may allow the browser at the client computing instance 102 to display the Web page by assembling the RDP processing result in the content display area of the browser without any further processing. In another embodiment, the RDP processing result may include a full virtual machine desktop and browser window corresponding to the full interface displayed at the NCC POP 142 browse session instance. The client computing device may automatically identify the area of the RDP processing result corresponding to the requested content, and may display only this area in the content display area of the browser.

At block 1014, the client computing device 102 processes local and remote user interactions. An illustrative routine for processing user interactions is provided below with reference to FIG. 11. At block 1016 the routine ends. Illustratively, a browse session instance instantiated by the network computing content provider 107 may terminate when a browser window or content display area is closed, may terminate when a remote session browse protocol is replaced by a parallel process at the client computing device 102, or may terminate in accordance with a timer or other event. Illustratively, if a browse session has terminated automatically due to a time-out but has associated content still displayed in a browser at the client computing device 102, later attempts by the user to interact with the content may result in a new browse session request being provided to the network computing service provider 107 to start a new browse session according to the last state of the terminated session. Illustratively, terminating a remote browse session after a time-out may allow the network computing storage provider 107 to save computing resources at the NCC POP. In one embodiment, this process may be transparent to the user at client computing device 102, even though the remote browse session has been terminated during the intervening period.

Figure 11:
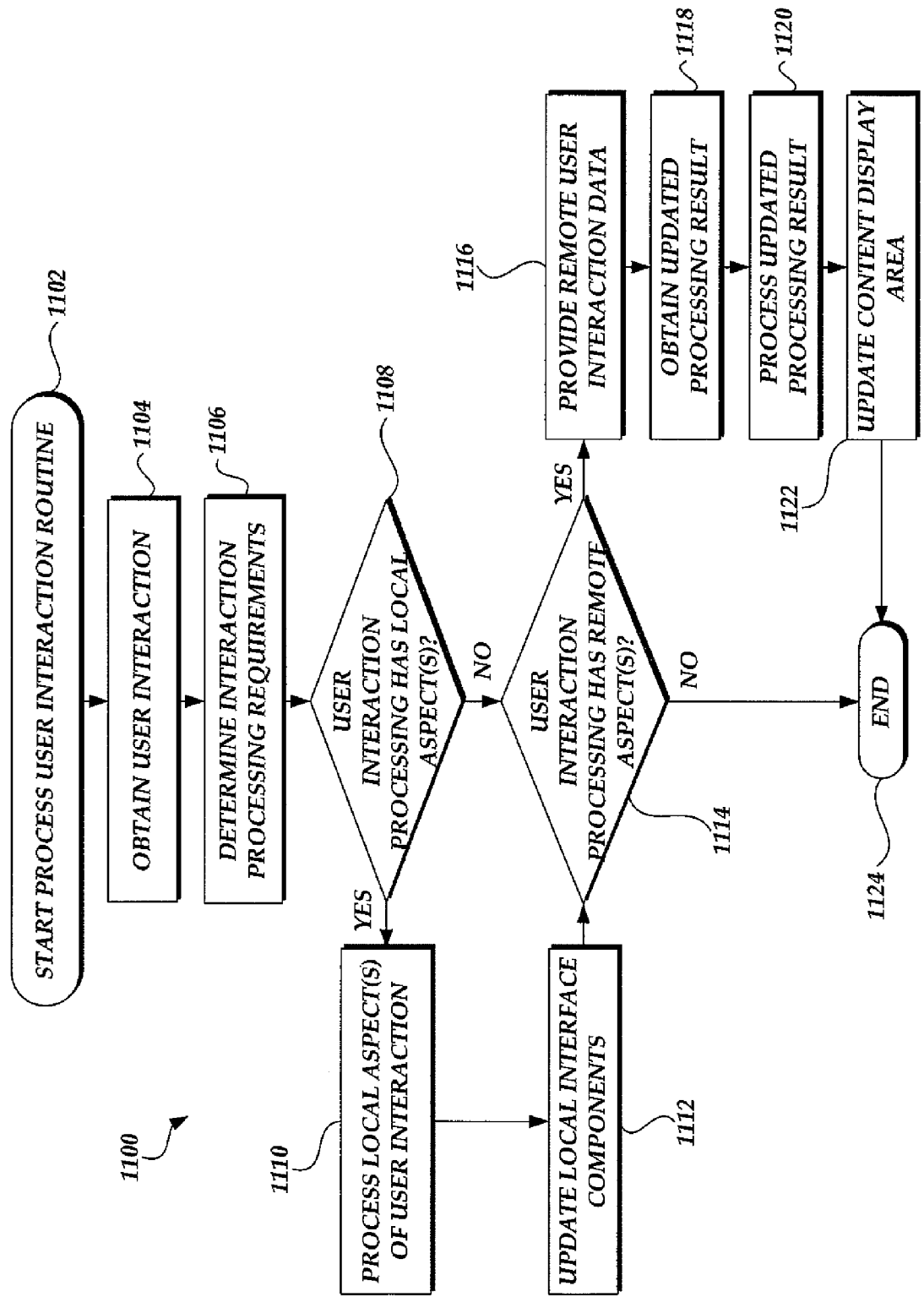
FIG. 11 is a flow diagram illustrative of a process user interaction routine implemented by a client computing device.

FIG. 11 is a flow diagram illustrative of a process user interaction routine 1100 implemented by a client computing device 102. Process user interaction routine 1100 begins at block 1102 in response to an interaction by a user. Illustratively, process user interaction routine 1100 may begin subsequent to the display of content in a content display area of a browser interface. For example, process user interaction routine 1100 may correspond to block 1014 of FIG. 10 above.

Illustratively, the displayed content may have one or more interactive elements, such as forms, buttons, animations, etc. User interaction with these interactive elements may require processing and display of updated content in the content display area. For example, selecting an element in a drop-down menu on a Web page may require processing and may change the configuration or visual appearance of the Web page or embedded resources. Illustratively, the processing required by user interaction with the displayed content may be handled as a local user interaction at the client computing device 102 or as a remote user interaction at the NCC POP 142 depending on the remote session browsing configuration in use. For example, if a remote session browsing configuration utilizing substantial local processing (e.g., sending unprocessed files over HTML), user interactions with displayed content may typically be handled as local user interactions at the client computing device 102. Illustratively, handling user interactions with displayed content as local user interactions at the client computing device 102 may allow for better responsiveness and fewer delays with simple user interactions (e.g., selection of a radio button, or typing text into a field), as interaction data corresponding to the interaction does not need to be sent to the NCC POP 142 for processing.

As a further example, if a remote session browsing configuration utilizing heavy remote processing of content (e.g., sending processed bitmap data over RDP) is being used as the remote session browsing configuration, all user interactions with displayed content may be handled as remote user interactions. For example, user input (e.g., keyboard inputs and cursor positions) may be encapsulated in RDP protocol data units and transmitted across network 108 to the NCC POP 142 for processing. Illustratively, the NCC POP 142 may apply the user interactions to the network content and transmit processing results consisting of updated bitmaps and interface data corresponding to an updated representation of the content back to the client computing device 102. Illustratively, handling user interactions with displayed content as remote user interactions at the NCC POP 142 may have a negative impact on interface responsiveness, as data is required to pass over the network and is limited by network latency; however, user interactions that require a substantial amount of processing may perform better when handled as remote user interactions, as the processing latency of the NCC POP 142 may be substantially lower than the processing latency of the client computing device 102.

In addition to a content display area for displaying network content, a browser may have one or more local interface components, such as toolbars, menus, buttons, or other user interface controls. Interactions with local interface components may be treated as local user interactions or remote user interactions depending on the processing required by the interaction and the remote session browsing configuration as further depicted in illustrative FIG. 7. For example, some local interface components may be managed locally by browser code running on the client computing device, while other local interface components may have one or more locally managed aspects (e.g., button click feedback, scroll bar redraw, etc.), and one or more remote managed aspects treated as remote user interactions (e.g., page refresh, requesting a page at an address in an address bar, etc.)

At block 1104, the client computing device 102 obtains a user interaction from the user. This user interaction may be an interaction with local interface components as described in FIG. 7 and above, or may be an interaction with any interactive elements of the content displayed in the content display area of the browser, such as form fields, buttons, animations, etc. User interaction with these local interface components or interactive elements of displayed content may require local and/or remote processing depending on the nature of the component or element and the processing split specified by the remote session browsing configuration as described in FIG. 7 and above. At block 1106, the client computing device 102 determines the interaction processing requirements for the obtained user interaction. At decision block 1108, if the user interaction has local aspects (e.g., button click feedback, a change to a local browser state, a content element being processed at the client computing device, etc.) the routine 1102 moves to block 1110 to process the local aspect or aspects of the user interaction at the client computing device 102, and subsequently update the local interface components at block 1112. Illustratively, and as discussed above, aspects of the interaction and updating interface components and elements locally allows a browser to provide responsive user interfaces and content. Subsequent to processing local aspect(s) of the user interaction, or if the user interaction has no local elements (e.g., a user interaction with a content element displayed in the content display area when using a remote session browsing configuration processing entirely on the server side and utilizing an RDP remote session communication protocol) the routine 1102 moves to decision block 1114. If the user interaction has remote aspects that require processing, the routine 1102 moves to block 1116 and provides remote user interaction data to the network computing provider 107. Illustratively, in the case of a heavily server side remote session browsing configuration utilizing an RDP remote session communication protocol, the remote user interaction data may include input data, such as a cursor position or keyboard input encapsulated in one or more RDP protocol data units. In some embodiments of remote session browsing configurations utilizing RDP or other remote session communication protocols, particular aspects of remote user interaction data such as cursor positions may be provided to the network computing provider 107 on a continuous basis, while in other embodiments of remote session browse configurations remote user interaction data may only be provided to the network computing provider 107 when associated with a user interaction that requires remote processing.

At block 1118, the client computing device 102 obtains an updated processing result from the network computing provider 107, the network computing provider 107 having processed the remote user interaction data to generate an updated representation of the content. At block 1120, the client computing device 102 performs any additional processing required on the updated processing result (based on the remote session browsing configuration) and at block 1122 displays the updated processing result in the content display area of the browser. At block 1124 the process user interaction routine 1102 ends. Illustratively, the routine may be executed again any number of times in response to further user interactions with the browser and displayed content.

With reference now to FIGS. 12-15, the interaction between various components of the networked computing environment 100 of FIG. 1 will be illustrated. Specifically, FIGS. 2-6 illustrate the interaction between various components of the networked computing environment 100 for the exchange of content between a client computing device 102, a content provider 104, and a CDN POP 116 via the network computing provider 107. For purposes of example, the illustrations have been simplified such that many of the components utilized to facilitate communications are not shown. One skilled in the relevant art will appreciate that such components can be utilized and that additional interactions would accordingly occur without departing from the spirit and scope of the present disclosure.

Figure 12:
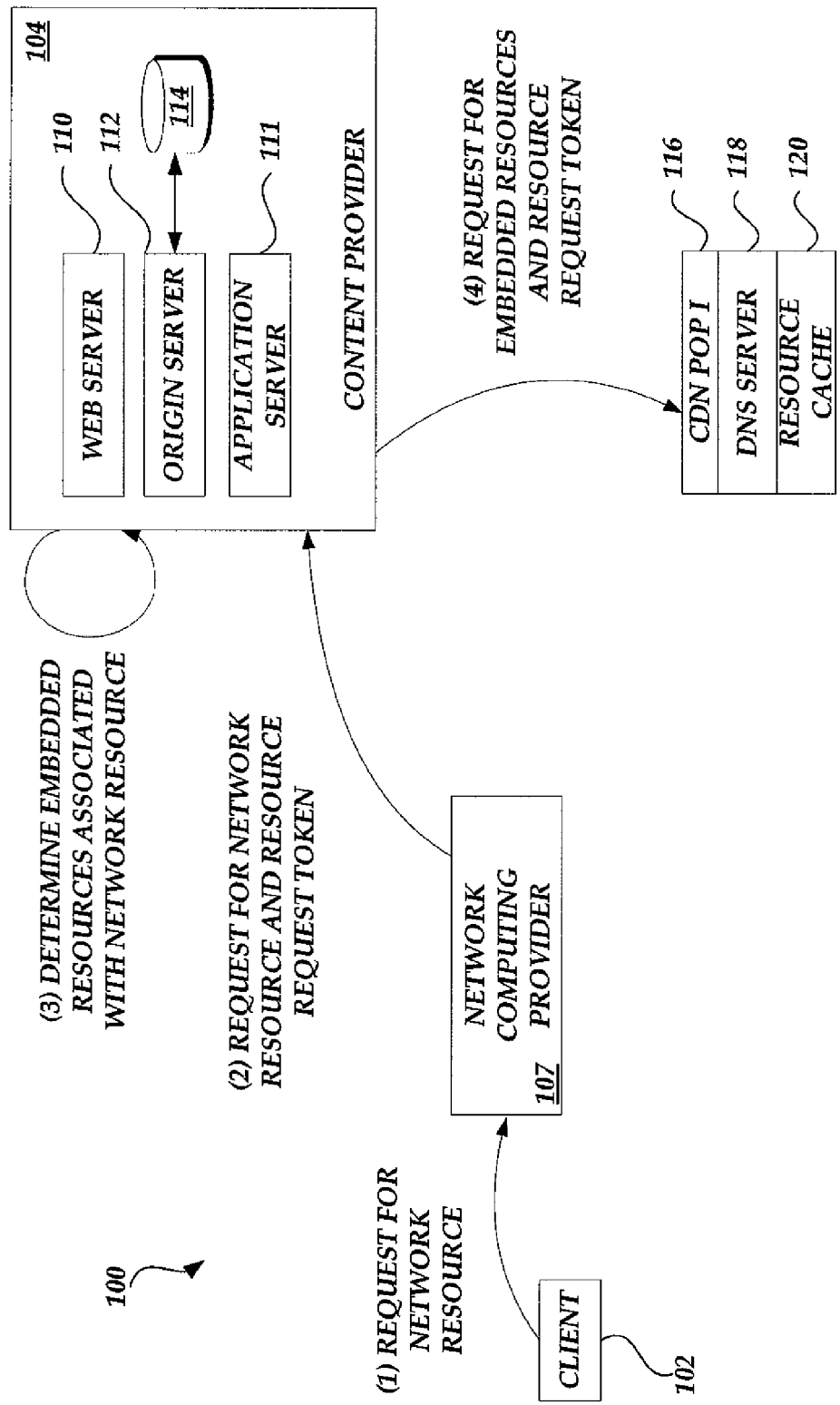
FIG. 12 is a block diagram of the content delivery environment of FIG. 1 illustrating the generation and processing of requests for a network content from a client computing device to a content provider and content delivery network point of presence through a network computing provider.

With reference to FIG. 12, a process can begin with the generation and processing of requests for a network content from a client computing device 102 to a content provider 104 and content delivery network point of presence 116 through a network computing provider 107. Illustratively, the client computing device 102 may provide a request for a network resource to a network computing provider 107. Illustratively, this request may be generated automatically as a result of the browser loading (e.g., a request for a default or "home" page), or may be generated as a result of a user following a link or entering a network address into an address bar. As discussed above with reference to FIGS. 2-11, the request for a network resource may comprise or be included within a request for a new browse session. Accordingly, in one embodiment, the network computing provider 107 may select a POP and/or cause the instantiation of a new browse session corresponding to the browse session request (not shown). In an illustrative embodiment, the network computing provider 107 utilizes a registration application program interface ("API") to accept browse session requests from the client computing device 102. The browse session request or network resource request can include network address information corresponding to a requested network resource, which may be in any form, including, but not limited to, an Internet Protocol ("IP") address, a URL, a Media Access Control ("MAC") address, etc. Illustratively, the network address or logical location of the network computing provider 107 may be hard coded into a browser or other application executing at the client computing device, or may be obtained from the client computing device, the user, a configuration file, provided by a network component, or obtained or determined by any other means.

Subsequent to receiving the network resource request from the client computing device 102, the network computing provider 107 may provide a request for the resource to the content provider 104. Illustratively, the network resource request from the client computing device 102 to the network computing provider 107 may be referred to as the client request, and the network resource request from the network computing provider 107 to the client computing device 102 may be referred to as the network computing provider request or network computing component request. The network computing provider 107 may further provide a resource request token with, or in addition to, the network computing provider request to the content provider 104. Illustratively, the resource request token may include or be provided in addition to information associated with or identifying the network computing provider 107, the network resource, and/or the network computing provider request.

The content provider 104 may process the requested network resource to determine associated embedded resources. For example, the content provider 104 may parse the requested network resource to identify one or more embedded resource identifiers referenced by the network resource. Determining embedded resources associated with the network resource may occur responsive to obtaining the network computing provider request, or may be performed prior to receipt of the request (e.g. in a pre-processing or background processing routine).

Subsequent to determining embedded resources associated with the network resource, the content provider 104 may provide one or more requests for the embedded resources to one or more other content providers or points of presence (POPs) associated with CDN providers represented here the CDN POP 116. For example, the content provider 104 may issue one or more DNS queries based on the embedded resource identifiers included in the network resource, or may otherwise determine the location of content providers or other network storage components for providing the determined embedded resources. The content provider 104 may additionally provide the request token and/or information identifying the network computing provider 107 to the CDN POP 116 or other content provider.

Figure 13:
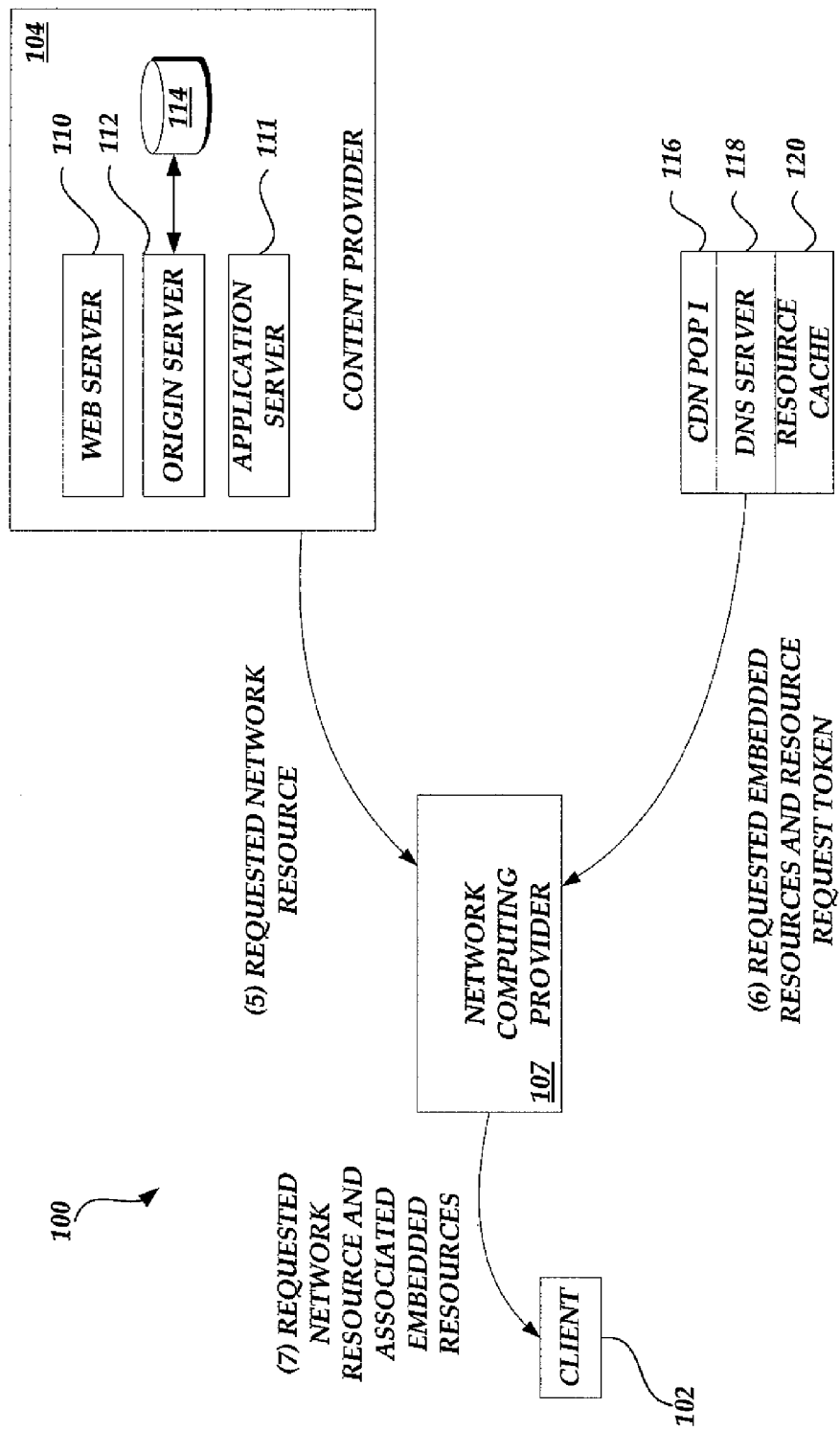
FIG. 13 is a block diagram of the content delivery environment of FIG. 1 illustrating the provision of network content from a content provider and content delivery network point of presence to a client computing device through a network computing provider.

With reference to FIG. 13, a process illustrating the provisioning of network content from a content provider 104 and content delivery network point of presence 116 to a client computing device 102 through a network computing provider 107 will be described. Illustratively, one or more of the actions or processes described with reference to FIG. 13 may be performed subsequent to the processing and transmission of requests described with reference to FIG. 12 above.

Illustratively, the content provider 104 may provide the network resource identified in the network computing provider request discussed with reference to FIG. 12 to the network computing provider 107. The CDN POP 116 may further provide embedded resources to the network computing provider 107 responsive to the request for embedded resources from the content provider 104 discussed with reference to FIG. 12. In one embodiment, the embedded resources may be accompanied by a request token associated with a network computing provider request from the network computing provider 107 to the content provider 104. Illustratively, the network computing provider 107 may utilize the request token to identify the provided embedded resources as corresponding to the associated network resource or network resource request. In one embodiment, the network computing provider 107 may only accept embedded resources or other network content accompanied by or associated with a request token. Illustratively, only accepting content accompanied or associated with a request token may allow the network computing provider 107 to ignore proffered content and network communications not associated with a requested network resource.

Subsequent to obtaining the network resource and associated embedded resources from the content provider 104 and CDN POP 116, the network computing provider 107 may perform any processing actions identified in a remote session browse configuration associated with a browse session instance at the network computing provider 107 as discussed above with FIGS. 2-11, and may provide a processing result corresponding to a representation of the network resource and the associated embedded resources to the client computing device for further processing and/or display. In various embodiments, the network computing component may provide one or more of the network resources and/or embedded resources in an unprocessed form, or in any other format or combinations of format, and may utilize any number of different communications protocols in transferring one or more pieces of content.

Figure 14A:
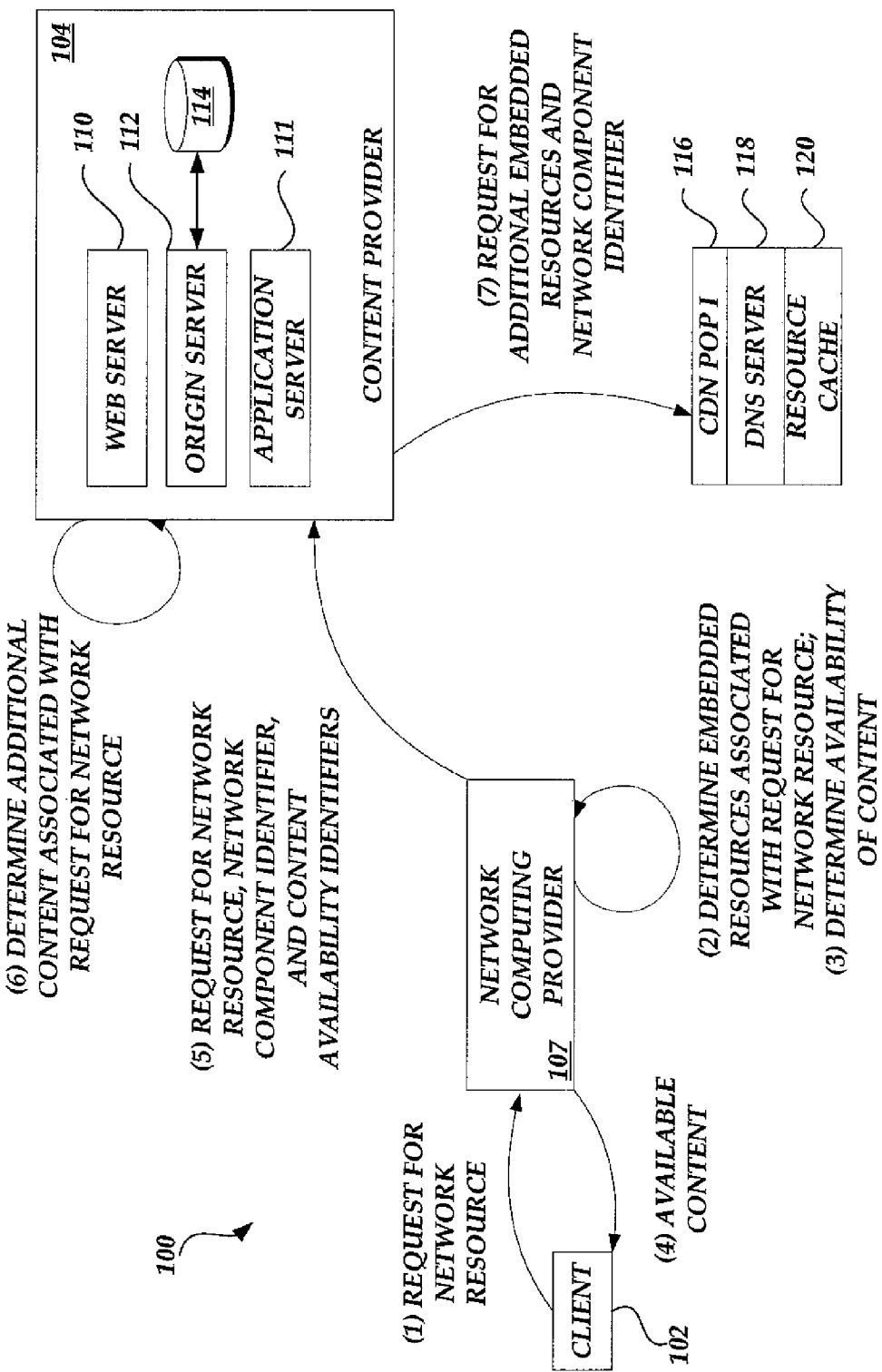
FIGS. 14A-14C area block diagrams of the content delivery environment of FIG. 1 illustrating various embodiments for the generation and processing of requests for network content between a client computing device, a network computing provider, a content provider, and a content delivery network point of presence.

With reference to FIG. 14A, in one embodiment, a process can begin with the generation and processing of requests for network content between a client computing device 102, a network computing provider 107, a content provider 104, and a CDN POP 116. Illustratively, the client computing device 102 may provide a client request for a network resource to a network computing provider 107. As discussed above with reference to FIGS. 2-11, the request for a network resource may comprise or be included within a request for a new browse session. Accordingly, in one embodiment, the network computing provider 107 may select a POP and/or cause the instantiation of a new browse session corresponding to the browse session request (not shown). The browse session request or network resource request can include network address information corresponding to a requested network resource, which may be in any form, including, but not limited to, an Internet Protocol ("IP") address, a URL, a Media Access Control ("MAC") address, etc.

Subsequent to receiving the client request for a network resource, the network computing provider 107 may determine embedded resources associated with the network resource or request for the network resource. For example, as discussed above with reference to FIG. 12, the network computing provider 107 may identify one or more associations between the network resource or request for network resource and embedded resources based on previous requests for the network resource. The network computing provider 107 may determine an availability of the identified content, including the requested network resource and any associated embedded resources. Illustratively, available content may correspond to network resources and/or embedded resources stored in a cache or other data store associated with the network computing provider. In one embodiment, the network computing provider 107 may provide any available content associated with the client network resource request to the client computing device 102. For example, the network computing component 107 may determine that it has versions of a requested Web page and images associated with the Web page in a data store associated with the network computing provider, and may accordingly send the version of the Web page and associated images to the client computing device 102. In another example, the network computing device may determine that one or more images are likely to be associated with a requested Web page based on past requests for Web pages from the same site. With regards to this example, the network computing device may provide the images to the client computing device 102. The client computing device may store or cache the available content received from the network computing component 107, and/or may begin processing the available content for display.

Independent of the processing and transmission of available content from the network computing component 107 to the client computing device 102, the network computing component 107 may provide a network computing provider request for the network resource to a content provider 104. More specifically, the request for the network resource can be processed prior to, simultaneous with, or subsequent to the transmission of the available content. The network computing provider request may be accompanied by or may include a network component identifier associated with a network address or other identifier of the network computing provider 107. The network computing provider request may further be accompanied by, or may include one or more content availability identifiers associated with an availability and/or a version of content available at the network computing provider 107. The network computing provider request may further be accompanied by a request token (not shown) as discussed above with reference to FIGS. 12 and 13.

The content provider 104 may obtain the network computing provider request for the network resource and any other accompanying information, and then process the requested network resource to determine embedded resources associated with the network resource. In one embodiment, the content provider 104 may further determine whether the network resource and/or any associated embedded resources associated with the network resource are available at the network computing provider 107. If resources are available at the network computing provider 107, the content provider can determine whether the versions of the resources at the network computing provider 107 are current or otherwise valid. Illustratively, the determination of the availability and current versions of resources at the network computing provider 107 may be based on one or more content availability identifier providers by the network computing provider, such as a hash, version information and the like. Resources determined to not be available or not up-to-date at the network computing component 107 may be referred to as additional content.

Subsequent to determining any additional content associated with the request for the network resource, the content provider 104 may provide a request for the additional embedded resources to a CDN POP 116. In one embodiment, the request for the additional embedded resources may include or be associated with the network component identifier associated with the network computing provider 107.

Figure 14B:
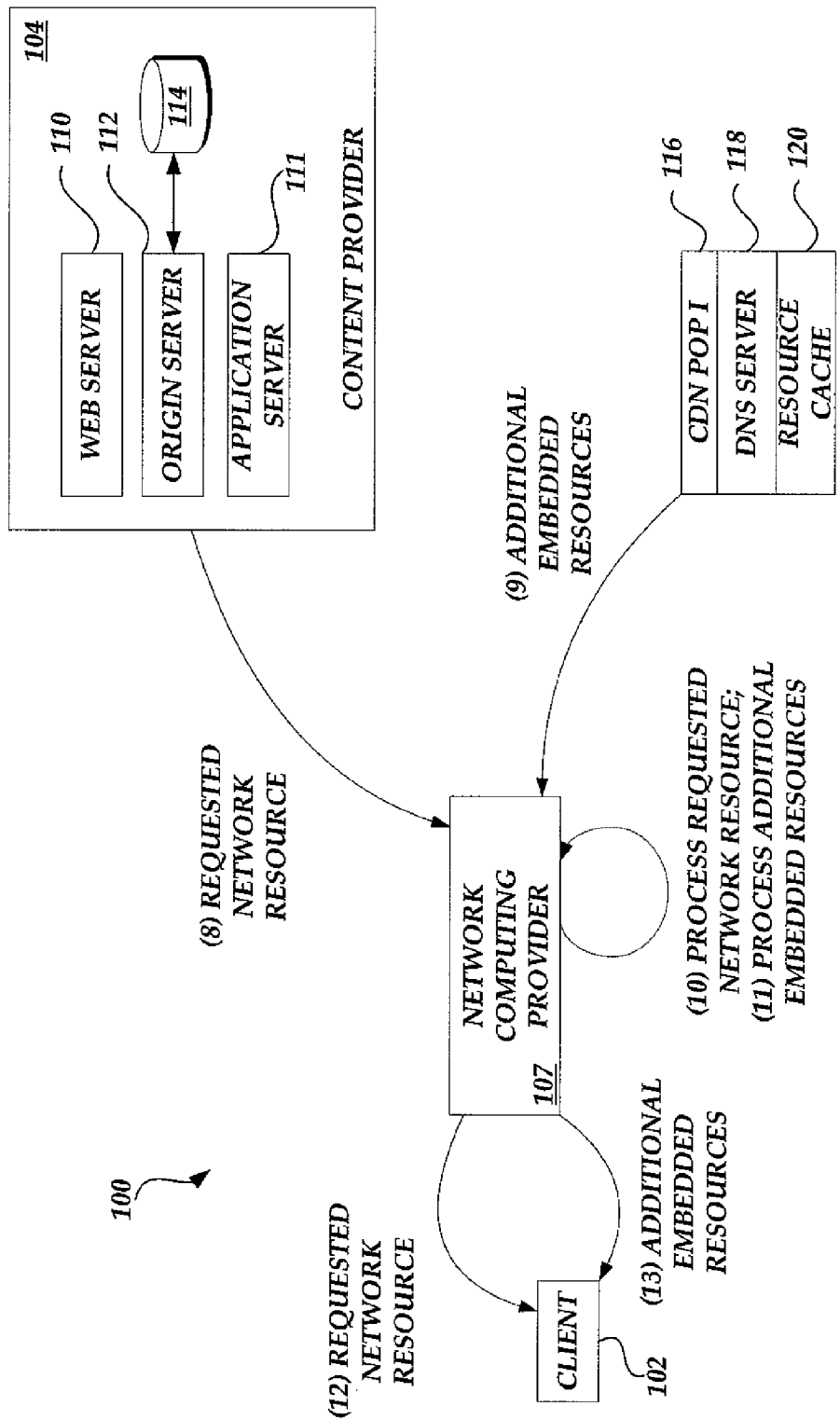

With reference now to FIG. 14B, for the purpose of an illustrative example, we may assume that the content provider 104 determines that the network resource associated with the network computing provider request is additional content required by the network computing provider 107 (e.g. a current version of the network resource is not available at the network computing component 107). Accordingly, the content provider 104 may provide the network resource to the network computing provider 107.

For the purpose of further example, we may assume that the content provider 104 determines that one or more of the embedded resources associated with the requested network resource are additional content also required by the network computing provider 107. Accordingly, the CDN POP 116 may provide any additional embedded resources to the network computing provider responsive to the request for embedded resources provided by the content provider 104. Still further, in another embodiment, the CDN POP 116 may also provide information associated with the embedded resources, such as configuration information, meta-data and the like. For example, the CD POP 116 may provide updates regarding expiration data for image data (e.g., an update to a time to live parameter ("TTL"). In one embodiment, the CDN POP 116 may identify or locate the network computing provider on the basis of the network component identifier provided by the content provider 104 as discussed above with reference to FIG. 14A.

Subsequent to receiving any additional content from the content provider 104 and CDN POP 116, the network computing provider 107 may process the additional content (e.g. process the requested network resource and received embedded resources). Processing the additional content at the network computing provider 107 may include storing the requested network resource and/or one or more of the additional embedded resources at a cache component or data store associated with the network computing provider 107, or updating associations between the network resource and embedded resources or other content for future requests for the network resource. In one embodiment, processing at the network computing provider 107 may further include performing any processing actions identified in a remote session browse configuration associated with a browse session instance at the network computing provider 107 as discussed above with regards to FIGS. 2-11. The network computing provider 107 may provide the requested network resource and any associated additional embedded resources to the client computing device 102. In one embodiment, the network computing provider 107 may alternately provide processing results corresponding to representation of one or more of the requested network resource and/or additional embedded resources as discussed with regards to FIGS. 2-11.

Figure 14C:
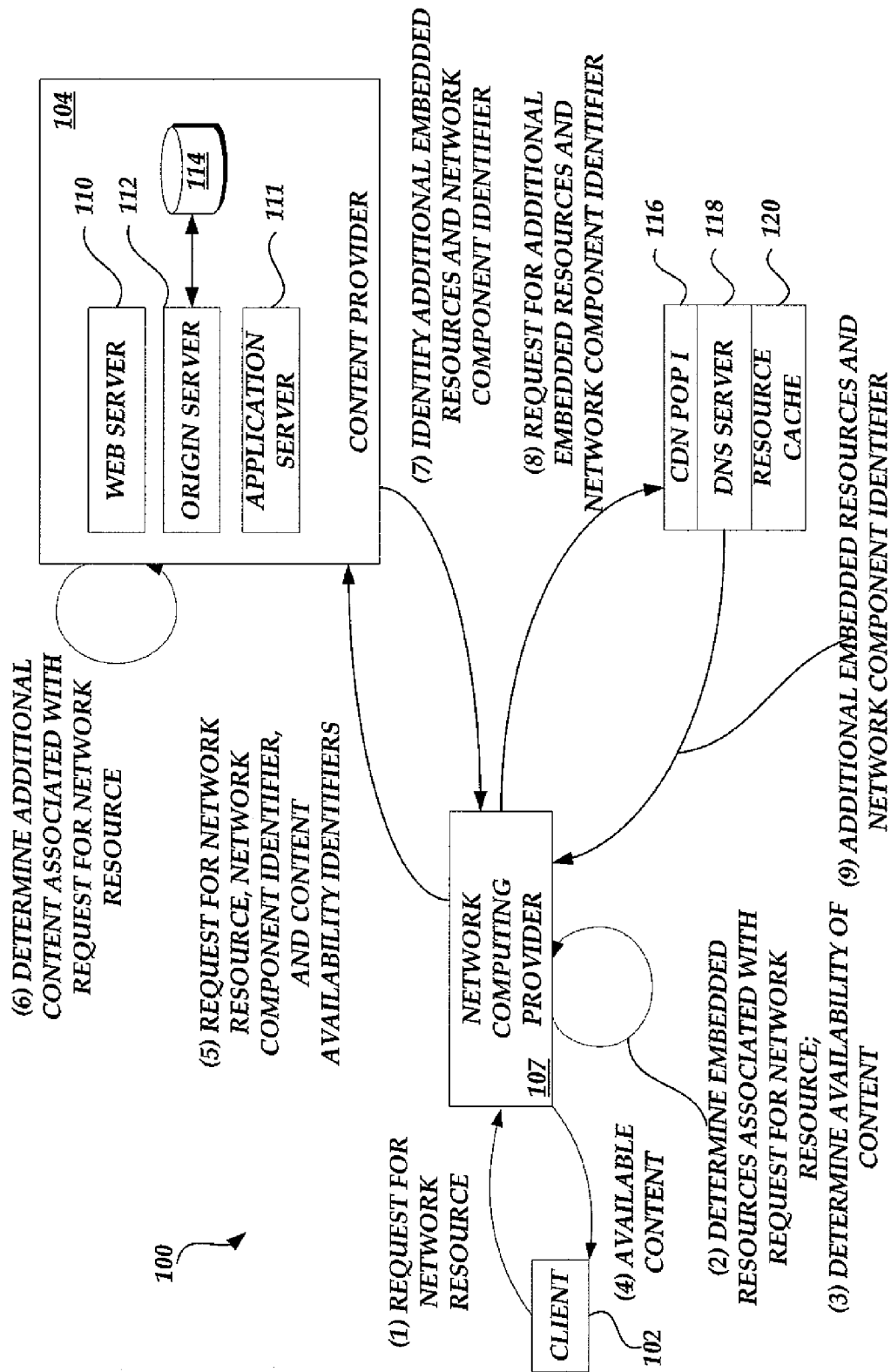

With reference to FIG. 14C, in another embodiment, a process can begin with the generation and processing of requests for network content between a client computing device 102, a network computing provider 107, a content provider 104, and a CDN POP 116. Illustratively, the client computing device 102 may provide a client request for a network resource to a network computing provider 107. As discussed above with reference to FIGS. 2-11, the request for a network resource may comprise or be included within a request for a new browse session. Accordingly, in one embodiment, the network computing provider 107 may select a POP and/or cause the instantiation of a new browse session corresponding to the browse session request (not shown). The browse session request or network resource request can include network address information corresponding to a requested network resource, which may be in any form, including, but not limited to, an Internet Protocol ("IP") address, a URL, a Media Access Control ("MAC") address, etc.

Subsequent to receiving the client request for a network resource, the network computing provider 107 may determine embedded resources associated with the network resource or request for the network resource. For example, as discussed above with reference to FIG. 12, the network computing provider 107 may identify one or more associations between the network resource or request for network resource and embedded resources based on previous requests for the network resource. The network computing provider 107 may determine an availability of the identified content, including the requested network resource and any associated embedded resources. Illustratively, available content may correspond to network resources and/or embedded resources stored in a cache or other data store associated with the network computing provider. In one embodiment, the network computing provider 107 may provide any available content associated with the client network resource request to the client computing device 102. For example, the network computing component 107 may determine that it has versions of a requested Web page and images associated with the Web page in a data store associated with the network computing provider, and may accordingly send the version of the Web page and associated images to the client computing device 102. In another example, the network computing device may determine that one or more images are likely to be associated with a requested Web page based on past requests for Web pages from the same site. With regards to this example, the network computing device may provide the images to the client computing device 102. The client computing device may store or cache the available content received from the network computing component 107, and/or may begin processing the available content for display.

Independent of the processing and transmission of available content from the network computing component 107 to the client computing device 102, the network computing component 107 may provide a network computing provider request for the network resource to a content provider 104. More specifically, the request for the network resource can be processed prior to, simultaneous with, or subsequent to the transmission of the available content. The network computing provider request may be accompanied by or may include a network component identifier associated with a network address or other identifier of the network computing provider 107. The network computing provider request may further be accompanied by, or may include one or more content availability identifiers associated with an availability and/or a version of content available at the network computing provider 107. The network computing provider request may further be accompanied by a request token (not shown) as discussed above with reference to FIGS. 12 and 13.

The content provider 104 may obtain the network computing provider request for the network resource and any other accompanying information, and then process the requested network resource to determine embedded resources associated with the network resource. In one embodiment, the content provider 104 may further determine whether the network resource and/or any associated embedded resources associated with the network resource are available at the network computing provider 107. If resources are available at the network computing provider 107, the content provider can determine whether the versions of the resources at the network computing provider 107 are current or otherwise valid. Illustratively, the determination of the availability and current versions of resources at the network computing provider 107 may be based on one or more content availability identifier providers by the network computing provider, such as a hash, version information and the like. Resources determined to not be available or not up-to-date at the network computing component 107 may be referred to as additional content.

Subsequent to determining any additional content associated with the request for the network resource, the content provider 104 may identify the additional embedded resources to a CDN POP 116. In one embodiment, the additional embedded resources may include or be associated with the network component identifier associated with the network computing provider 107.

With continued reference to FIG. 14C, for the purpose of an illustrative example, we may assume that the content provider 104 determines that the network resource associated with the network computing provider request is additional content required by the network computing provider 107 (e.g. a current version of the network resource is not available at the network computing component 107). Accordingly, the content provider 104 may provide the network resource to the network computing provider 107. For the purpose of further example, we may assume that the content provider 104 determines that one or more of the embedded resources associated with the requested network resource are additional content also required by the network computing provider 107.

In this embodiment, however, the content provider 104 transmits the identification of the one or more embedded resources to the network computing provider 107. In turn, the network computing provider 107 can transmit the request directly to the CDN POP 116. Upon receipt of the request, the CDN POP 116 may provide any additional embedded resources to the network computing provider responsive to the request for embedded resources provided by the content provider 104. In one embodiment, the CDN POP 116 may identify or locate the network computing provider on the basis of the network component identifier provided by the content provider 104 as discussed above.

Subsequent to receiving any additional content from the content provider 104 and CDN POP 116, the network computing provider 107 may process the additional content (e.g. process the requested network resource and received embedded resources). Processing the additional content at the network computing provider 107 may include storing the requested network resource and/or one or more of the additional embedded resources at a cache component or data store associated with the network computing provider 107, or updating associations between the network resource and embedded resources or other content for future requests for the network resource. In one embodiment, processing at the network computing provider 107 may further include performing any processing actions identified in a remote session browse configuration associated with a browse session instance at the network computing provider 107 as discussed above with regards to FIGS. 2-11. The network computing provider 107 may provide the requested network resource and any associated additional embedded resources to the client computing device 102. In one embodiment, the network computing provider 107 may alternately provide processing results corresponding to representation of one or more of the requested network resource and/or additional embedded resources as discussed with regards to FIGS. 2-11.

Figure 15:
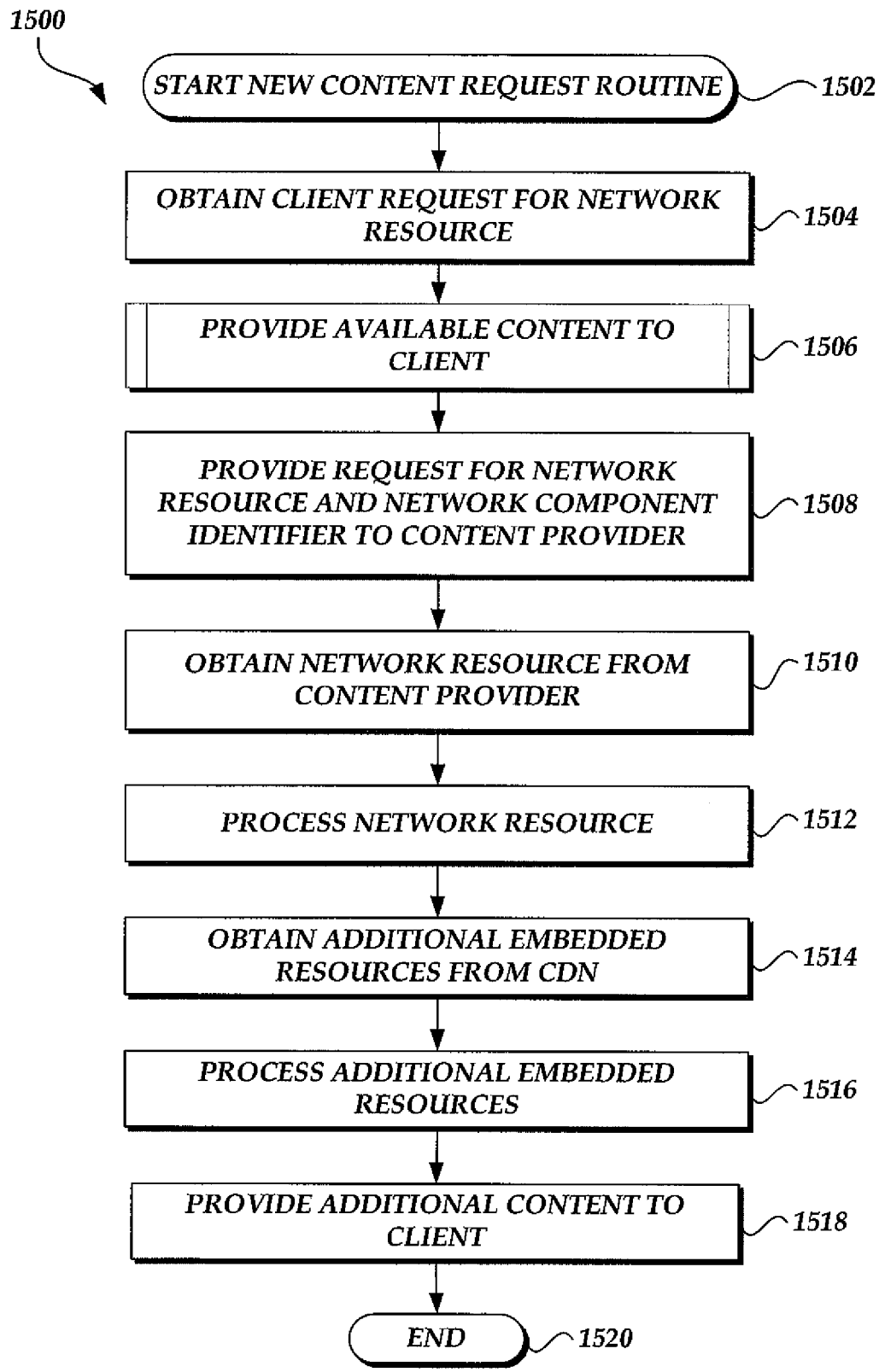
FIG. 15 is a flow diagram illustrative of a new content request routine implemented by a network computing provider.

FIG. 15 is a flow diagram illustrative of a new content request routine 1500 implemented by a network computing provider 107. New content request routine 1500 begins at block 1502. At block 1504, the network computing provider 107 obtains a client request for a network resource from the client computing device 102. In one embodiment, as discussed above with reference to FIGS. 2-11, the client request for a network resource may comprise or be included within a request for a new browse session. Accordingly, in one embodiment, the network computing provider 107 may select a POP for a new browse session, and/or cause the instantiation of a new browse session responsive to the browse session request.

At block 1506, the network computing provider 107 may process the client request for the network resource and provide any available content to the client computing device 102. An illustrative routine for providing available content to the client computing device 102 is provided below with reference to FIG. 17.

At block 1508, the network computing provider 107 may provide a network computing provider request for the network resource to a content provider 104. Illustratively, this request for the network resource may be provided over an HTML protocol, or over any number of other public or propitiatory protocols as known in the art. In various embodiments, the network computing provider request for the network resource may be accompanied by one or more network component identifiers, content availability identifiers, request tokens, and/or any other information associated with the network computing provider 107, the client computing device 102, the requested network resource, associated content, and/or previous requests. Illustratively, identifiers, tokens, and other information may be included in the network computing provider request, or may be provided in any number of additional or alternative transmissions over any number of different communications protocols.

In one embodiment, the network computing provider request may be accompanied by a network component identifier. Illustratively, a network component identifier may include information associated with a network address of the network computing provider 107, or other identifying information. In some embodiments, the content provider 104 may provide requests for content to one or more other content providers or content delivery network providers on behalf of the network computing provider 107 as described below. In several of these embodiments, the other content providers and/or content delivery network providers may utilize the network component identifier or associated information to determine a network address of a component associated with the network computing provider 107 to which to transmit content. For example, in one embodiment, the network component identifier may include a network address (e.g., an IP address) of a NCC POP that has instantiated a remote browse session associated with the network resource request from the client computing device 102. With regards to this example, other content providers and CDN providers receiving requests for additional content by the content provider 104 may utilize the network address to provide content to the NCC POP for processing. In another example, the network component identifier may include an identifier corresponding to the network computing provider 107. With regards to this example, the other content providers and CDN providers receiving requests for additional content by the content provider 104 may store information allowing for a lookup of an appropriate network address associated with the network computing provider 107 on the basis of the network component identifier. For the purposes of this example, the lookup information may have been provided by the network computing provider 107, the content provider 104, and/or any other entity or component. The network computing provider request may further be accompanied by one or more content availability identifiers as discussed further below with regards to FIG. 17.

The network computing provider request may still further be accompanied by one or more request tokens associated with the client request or network computing provider request for the network resource. Illustratively, and as discussed below, a request token may allow the network computing provider 107 to associate content received from a content provider or CDN provider with a request for a network resource.

At block 1510, the network computing provider 107 obtains the requested network resource from the content provider 104. Although the requested network resource is depicted here for purposes of illustration as being obtained before other additional embedded resources, one of skill in the relevant art will appreciate that any combination of the requested network resource and/or additional associated embedded resources may be obtained from any combination of content providers and CDN provider, and may be obtained simultaneously or sequentially in any order. Illustratively, the requested network resource may be provided by the content provider 104 responsive to the network computing provider request as discussed further with reference to FIG. 18 below. Although the network computing provider 107 is described herein for purpose of example as obtaining the requested network resource from the content provider 104, in another embodiment, the network computing provider 107 obtains the requested network resource from a content provider or a CDN provider different than the content provider 104. Illustratively, the content provider or CDN provider different than the content provider 104 may provide the requested network resource responsive to a request by the content provider 104 on behalf of the network computing provider 107, for example, as described below in block 1514 and FIG. 18 with regards to additional embedded resources. In one embodiment, the content provider or CDN provider different than the content provider 104 may initiate the transmission of content with the network computing provider 107 over a previously open network connection, or may open a new network connection with the network computing provider 107. In still further embodiments, the requested network resource may be accompanied by a request token as discussed in more detail below with regards to block 1514.

In one embodiment, the content provider 104 may not provide the network resource if the content provider 104 has determined that an up-to-date copy of the network resource is available at the network computing provider, as discussed below with reference to FIG. 18. In a further embodiment, if the content provider 104 determines that an up-to-date copy of the network resource is available at the network computing provider, the content provider 104 may provide a message or other information to the network computing provider 107 indicating that the copy of the network resource available at the network computing provider 107 is up-to-date.

At block 1512, the network computing provider 107 processes the network resource. Processing the additional content at the network computing provider 107 may include storing the requested network resource and/or one or more of the additional embedded resources at a cache component or data store associated with the network computing provider 107, and/or updating associations between the network resource and embedded resources or other content to be utilized during future requests for the network resource as discussed in FIG. 17 below. In one embodiment, processing at the network computing provider 107 may further include performing any processing actions identified in a remote session browse configuration associated with a browse session instance at the network computing provider 107 as discussed above with regards to FIGS. 2-11.

At block 1514, the network computing provider 107 obtains any additional embedded resources from one or more content provider or CDN provider. Illustratively, additional embedded resources may include resources that were determined not to be available or up-to-date at the network computing provider 107. As discussed elsewhere and at least with regards to FIG. 18 below, the additional embedded resources may be provided responsive to content requests provided by the content provider 104 on behalf of the network computing provider 107. As discussed above, the additional embedded resources or other content may be provided to the network computing component 107 on the basis of a network component identifier transmitted to the content provider or CDN provider by the content provider 104. In one embodiment, the content provider or CDN provider may initiate the transmission of content with the network computing provider 107 over a previously open network connection, or may open a new network connection with the network computing provider. In another embodiment, the content provider 104 may provide one or more of the additional embedded resources.

In some embodiments, the additional embedded resources, network resources, and other content may be accompanied by a request token or other information identifying the additional embedded resources, the associated network resource, the source content provider or CDN provider, the content provider 104, the network computing provider 107, the client computing device 102, or other entity or component. In one embodiment, the network computing provider 107 may associate content obtained from content providers or CDN providers with a client request or network computing device request for a network resource based on the request token. In one embodiment, the network computing provider 107 may be configured to only accept additional embedded resources, requested network resources and/or other content accompanied by a request token or other identifying information. Illustratively, this may in some embodiments limit the impact of contenting malfunctioning or rogue content providers sending content unassociated with a request by the network computing provider 107. In various other embodiments, token information or other information associating content (e.g., the requested network resource, associated embedded content, etc.) with the network computing provider 107, the content provider 104, the client computing device 102, or one or more requests for a network resource may be included in metadata such as a header associated with the content or transmission of the content, or provided to the network computing provider 107 in any other way.

At block 1516, the network computing provider 107 processes the additional content (e.g., additional embedded resources). Processing the additional content at the network computing provider 107 may include storing the requested network resource and/or one or more of the additional embedded resources at a cache component or data store associated with the network computing provider 107, and/or updating associations between the network resource and embedded resources or other content to be utilized during future requests for the network resource as discussed in FIG. 17 below. Illustratively and with regard at least to blocks 1512 and 1515, a decision to store a network resource or additional embedded resource in a cache or data store associated with the network computing device 107 may be made on the basis of any number of factors including, but not limited to, an access history or popularity of a network resource or associated embedded resource, a predicted popularity or frequency of access of a network resource or associated embedded resource, a size, type or format of the network resource or associated embedded resource, a past, current, or predicted computational or network utilization, preferences or predefined configurations at the network computing or storage device, a cache/do not cache flag provided by the content provider or CDN provider, or any other information, configuration, or preference associated with a user or client computing device 102, computing and storage device 107, content provider 104, CDN provider or other content provider, network, or other entity.

In one embodiment, processing at the network computing provider 107 may further include performing any processing actions identified in a remote session browse configuration associated with a browse session instance at the network computing provider 107 as discussed above with regards to FIGS. 2-11.

At block 1518, the network computing provider 107 provides any additional content to the client computing device 102. Illustratively, the additional content may include the requested network resource and/or any additional embedded resources that were not provided to the client as available content in block 1506 above. In one embodiment, providing additional content to the client computing device may include providing one or more of the network resources and embedded resources to the client computing device 102 in their original forms (i.e., as obtained from the content provider 104 or other content provider or CDN provider). In another embodiment, providing additional content to the client computing device may include providing processing results corresponding to representations of the content as discussed in FIGS. 2-11 above. In the context of this embodiment, each resource or piece of content may be processed and/or transmitted according to a different remote session browse configuration, and/or may be processed in the same or different browse sessions at the network computing provider 107. Illustratively, in one embodiment the network resource and/or additional embedded resources may be provided to the client computing device 102 separately over an HTML protocol or over any other communications protocol known in the art. In other embodiments, multiple resources or pieces of content may be provided to the client computing device 102 as part of a single transmission and/or as processing results corresponding to representations of one or more pieces of content. Illustratively, in one embodiment, a client computing device 102 may have only originally requested the network resource from the network computing provider 107 in the client request as described above. The network computing provider 107 may accordingly initiate the transmission of content with the client computing device 102 over an open network connection (e.g., over the network connection originally used to transmit the client request for the network resource), or may open a new network connection with the client computing device 102 to transmit any additional content.

At block 1520, routine 1500 ends. Subsequent to receiving the additional content, the client computing device 102 may display the content along with any available content obtained with reference to block 1506 and FIG. 17 below. In one embodiment, display of content at the client computing device 102 may include additional processing of processing results as described with reference to FIGS. 2-11 above.

Figure 16:
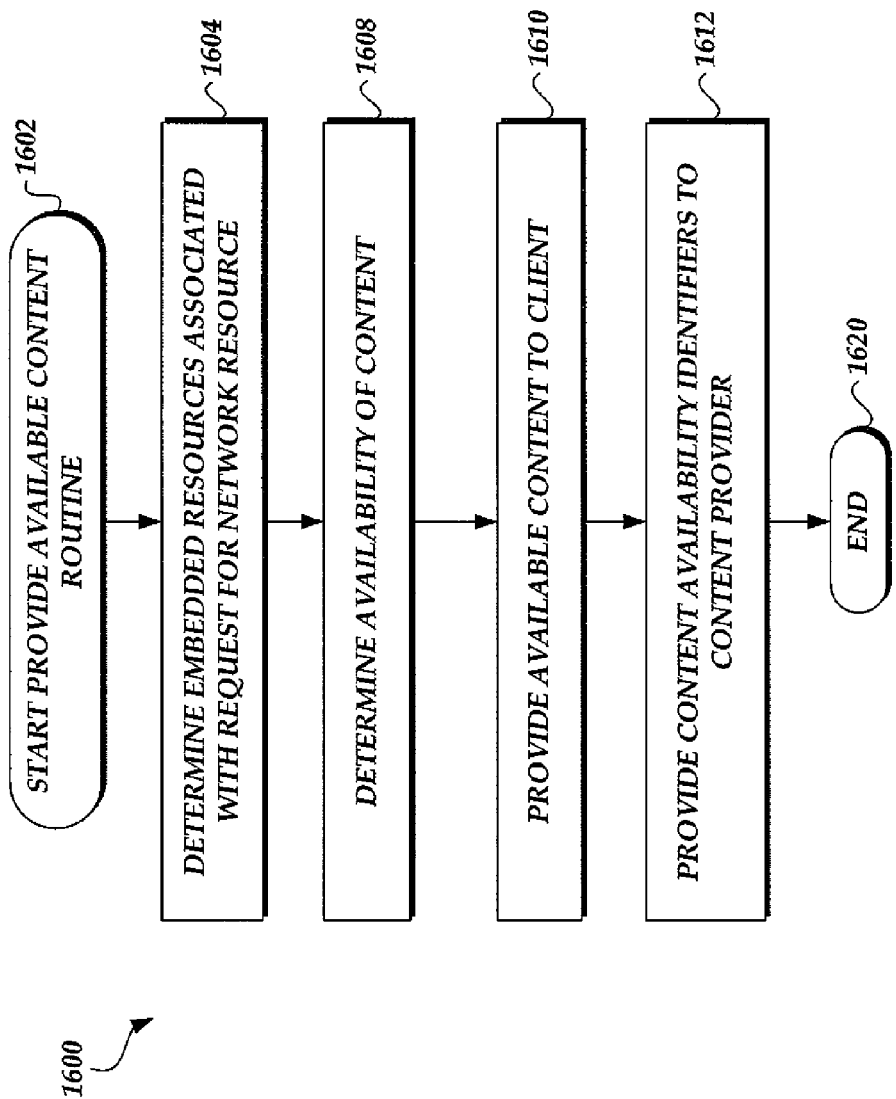
FIG. 16 is a flow diagram illustrative of a provide available embedded content routine implemented by a network computing provider.

FIG. 16 is a flow diagram illustrative of a provide available content routine 1600 implemented by a network computing provider 107. The provide available content routine 1600 begins at block 1604. Illustratively, the provide available content routine 1600 may occur responsive to receipt of a network resource request from the client computing device 102. For example, in one embodiment, the provider available content routine 1600 may correspond to block 1506 of illustrative FIG. 15 above.

At block 1604 the network computing provider 107 determines one or more embedded resources associated with a request for a network resource. In one embodiment, if the network resource is available to the network computing provider 107 (e.g., accessible in a cache component or data store associated with the network computing provider 107), the network computing provider 107 may determine one or more embedded resources associated with the request for the network resource based on processing of the network resource. For example, the network computing provider 107 may process a Web page to identify embedded resource identifiers corresponding to embedded resources associated with the Web page. In another embodiment, the network computing provider 107 may maintain associations between network resources and/or requests for network resources and embedded resources based on past or predicted requests for content. For example, the network computing provider 107 may process embedded resources provided in association with a particular network resource in order to generate and/or maintain associations between the network resource and the embedded content. The network computing provider 107 may accordingly identify embedded content associated with the network resource or request for network resource based on these associations, even without maintaining a copy of the network resource itself.

In other embodiments, the network computing provider 107 may maintain associations between categories or groups of network resources and embedded resources. Illustratively, these groups of network resources may include, but are not limited to, network resources of a particular type or format, network resources associated with a particular content provider or CDN provider, network resources associated with a particular network address, resource identifier (e.g., a particular URL), and/or any other group based on any number of attributes of the network resource or associations with other entities or types of content.

In still further embodiments, the network computing provider 107 may dynamically determine or otherwise predict embedded resources associated with a network resource, or request for network resource based on observations or stored associations associated with other similar network resources, or network resources of a same or similar grouping as discussed above.

At block 1608, the network computing provider 107 may determine an availability of content such as the requested network resource and/or any associated embedded resources as determined in block 1604. Illustratively, available content may include, but is not limited to, content stored in a cache component or data store associated with the network computing provider. For example, an NCC POP receiving a network resource may have a version of the network resource and one or more pieces of embedded content stored in a local or network data store or other storage location accessible by the network computing provider 107

At block 1610, the network computing provider 107 may provide any content determined to be available in block 1608 to the client computing device 102. Illustratively, providing available content may include providing the requested network resource and/or associated embedded content to the client computing device 102. In one embodiment, the network computing provider 107 may provide the latest available versions of any available content, and may provide available content to the client computing device 102 with or without verifying that versions stored in an associated cache component or data store are the most recent or up-to-date versions.

In one embodiment, providing available content to the client computing device 102 may include providing an available requested network resource and/or available embedded resources to the client computing device 102 in an original form (i.e., as originally obtained from a content provider or CDN provider). In another embodiment, providing additional content to the client computing device may include providing processing results corresponding to representations of the content as discussed in FIGS. 2-11 above. For example, one or more of the requested network resource and/or the available embedded resources may have been processed according to a remote session browse configuration before being stored in the cache component or data store associated with the network computing component 107. As another example, one or more of the requested network resource and/or associated available embedded content may be processed and transmitted to the client computing device 102 in accordance with a remote session browse configuration after being retrieved from the cache component or data store associated with the network computing device 107. In the context of this embodiment, each resource or piece of content may be processed and/or transmitted according to a different remote session browse configuration, and/or may be processed in the same or different browse sessions at the network computing provider 107.

In one embodiment, the network resource and/or additional embedded resources may be provided to the client computing device 102 separately over an HTML protocol or over any other communications protocol known in the art. In other embodiments, multiple resources or pieces of content may be provided to the client computing device 102 as part of a single transmission and/or as processing results corresponding to representations of one or more pieces of content. Illustratively, in one embodiment, a client computing device 102 may have only requested the network resource and not any other associated content from the network computing provider 107 in the client request as described above with regards to FIG. 16. The network computing provider 107 may accordingly initiate the transmission of content with the client computing device 102 over an open network connection (e.g., over the network connection originally used to transmit the client request for the network resource), or may open a new network connection with the client computing device 102 to transmit any available content.

In a further embodiment, the network computing provider 107 may not immediately provide available content to the client computing device 102, but may begin processing the content in accordance with a remote session browse configuration. For example, a network computing provider 107 may identify available content, such as one or more versions of the requested network resource and/or associated embedded resources that are located in a cache component or data store associated with the network computing provider 107. The network computing provider 107 may begin processing the available content to generate processing results in accordance with a remote session browse configuration in preparation of providing processing results to the client or in preparation of obtaining one or more pieces of additional content from a content provider or CDN provider. Illustratively, simultaneous with, prior to, or subsequent to processing available content and/or providing content or processing results to the client computing device, the network computing device 107 may provide information and/or a network computing device request to a content provider 104 as further discussed below.

At block 1612, the network computing component may provide content availability identifiers to the content provider 104. Illustratively, content availability identifiers may be provided as part of the network computing provider request discussed above with reference to FIG. 16, or at any other time. Illustratively, the content availability identifiers may be associated with an availability of content at the network computing provider 107 (e.g., whether content is available in a cache component or other data store at the network computing provider 107). The content availability identifiers may further indicate information associated with a version of any content available at the network computing provider 107. In one embodiment, a content availability identifier may include one or more hashes or checksum of contents of the requested network resource and/or other embedded resources. In some embodiments, a hash or checksum may represent only a portion of content available at the network computing provider 107. For example, a checksum may be generated for a network resource with transient information (e.g., advertisements or other information that may vary between instances of the network resource) excluded. In further embodiments, a content availability identifier may include names or identifiers of content available at the network computing device, dates associated with content available at the network computing device (e.g., dates modified, created, retrieved, etc.), information associated with a last request for the content, or any other information.

At block 1620, the routine 1600 ends. In one embodiment, the network computing component 107 may continue to provide a network computing provider request for the network resource as depicted for the purpose of illustration in block 1608 of FIG. 16 above.

Figure 17:
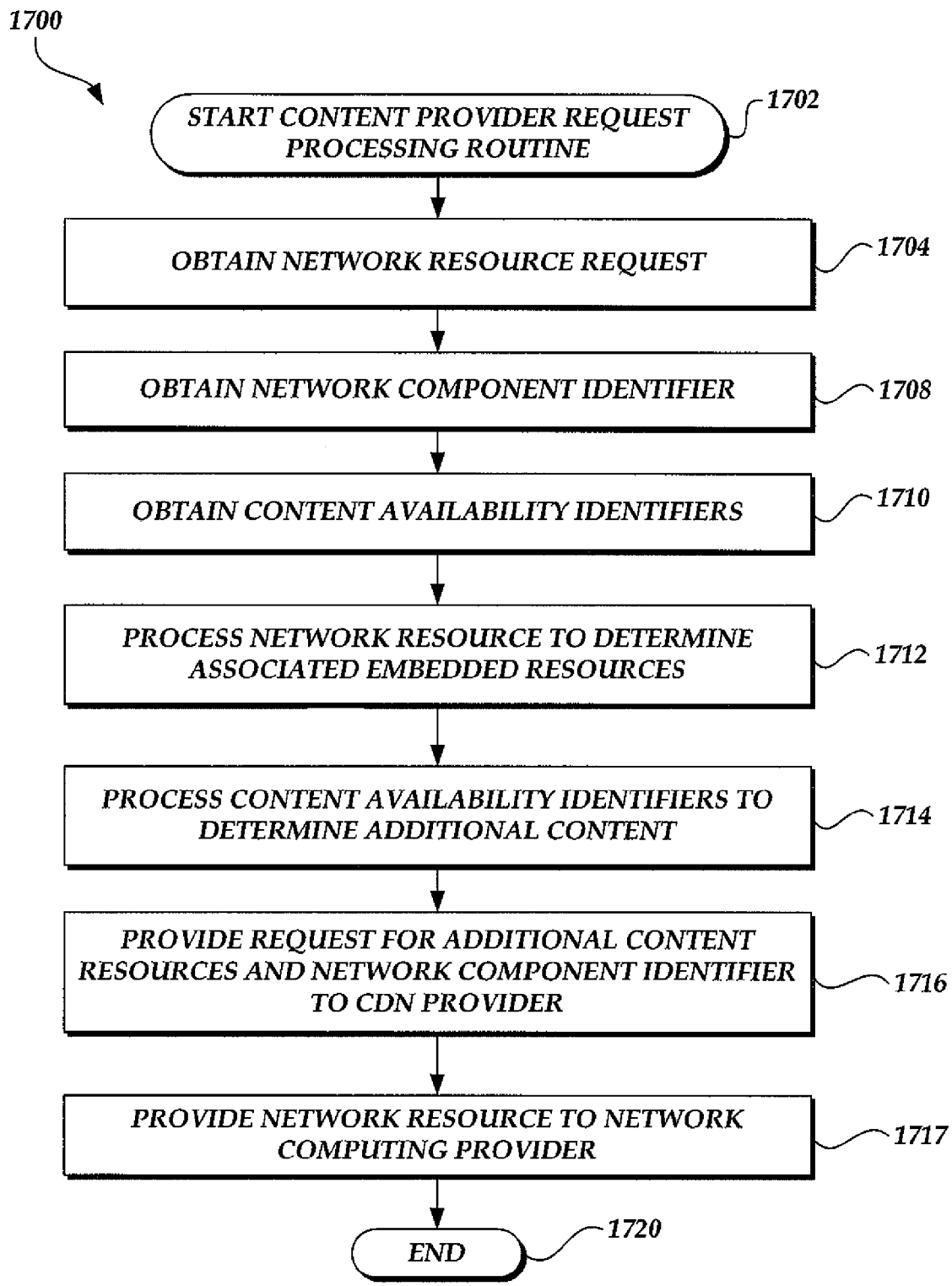
FIG. 17 is a flow diagram illustrative of a content provider request processing routine implemented by a content provider.

FIG. 17 is a flow diagram illustrative of a content provider request processing routine 1700 implemented by a content provider 104. Illustratively, content provider request processing routine 1700 may begin at block 1702. At block 1704, the content provider 104 receives a network computing provider request for a network resource. In various embodiments, the content provider 104 may further obtain a request token associated with the request for the network resource. At block 1708, the content provider 104 receives a network component identifier as discussed above with respect to FIG. 16. At block 1710, the content provider 104 obtains one or more content availability identifiers as discussed above with regards to FIG. 16. Although obtaining the request for a network resource, the network component identifier and one or more content availability identifiers are depicted here as occurring in a particular order in discrete blocks, one of skill in the relevant art will appreciate that any combination of identifiers, tokens, or requests may be obtained from the network computing provider 107 simultaneously or sequentially in any order. In various embodiments, one or more identifiers or tokens may or may not be associated with or included in a network computing provider request for a network resource.

At block 1712, the content provider 104 may process the requested network resource to identify embedded resources associated with the network resource. For example, the network computing provider 107 may process a Web page to identify embedded resource identifiers corresponding to embedded resources associated with the Web page. In one embodiment, the content provider 104 may process the requested network resource to identify associated embedded resources responsive to the network computing provider request received from the network computing provider. In another embodiment, the content provider 104 may preprocess one or more network resources before the request is received. For example, the content provider 104 may process network resources continuously and/or automatically and add associations between network resources and embedded resources to a data base or other data store in preparation of receiving a request for the network resource. In another example, the content provider 104 may process a network resource to determine associated embedded resources the first time the network resource is requested, and store any determined embedded resource identifiers or associations between the network resource and embedded resources for subsequent requests. Illustratively, the content provider 104 may reprocess the network resource if is determined to have changed since associated embedded resources were determined.

At block 1714, the content provider 104 may process content availability identifiers associated with the request for the network resource to determine any additional content needed by the network computing component 107. Illustratively, additional content may include any network resource and/or associated embedded resource not available at the network computing provider 107. For example, the content provider 104 may compare checksums of available content at the network computing provider 107 included in the content availability identifiers to checksums of the network resource, and associated embedded resources at the content provider 104 to determine outdated or missing content at the network computing provider 107. In one embodiment, the content provider 104 may determine all additional content needed based on content availability identifiers. In other embodiments, the content provider 104 may provide one or more content availability identifiers to other content provider and/or CDN providers along with requests for additional content as described below. Illustratively, the other content providers or CDN providers may process the content availability identifiers along with the request for additional content, and may refrain from sending the requested additional content to the network computing provider 107 if a determination is made that the available content at the network computing provider 107 includes an up-to-date version of the requested additional content.

At block 1716, the content provider 104 may provide requests for additional content (e.g., requests for the requested network resource and/or associated embedded resources not available at the network computing provider 107) to any number of other content providers or CDN providers on the behalf of the network computing provider 107. Illustratively, the content provider 104 may provide a network component identifier identifying the network computing provider 107. The content provider 104 may also provide one or more content availability identifiers as discussed above and/or a request token corresponding to the original client request for the network resource, or the network computing provider request for the network resource.

For example, the content provider 104 may determine that a particular image associated with a requested Web page is unavailable at the network computing provider 107, or is available but is an outdated version. The content provider 104 may provide a CDN provider serving the image with a request to send the image to the network computing provider 107. The request to provide the image to the network computing provider 107 may be accompanied by or include a network component identifier, such as a network address, allowing the CDN provider to locate and provide the requested content to the network computing provider 107. The request may further be accompanied by, or include a request token, which may be transmitted with or in addition to the content provided to the network computing provider 107. Illustratively providing the request token to the network computing provider 107 may allow the network computing provider 107 to associate the incoming content with the original request for the network resource as discussed above with reference to FIG. 16. The request may still further be accompanied by, or include one or more content availability identifiers. As described above with reference to FIGS. 16 and 17, based on the one or more content availability identifiers, the CDN provider may determine whether an up-to-date version of the requested content is already available at the network computing provider 107, and, if so, may refrain from providing the content. In one embodiment, the CDN provider or additional content providers may provide a message or other information to the network computing provider 107 indicating that a version of content available at the network computing provider 107 is up-to-date.

In one embodiment, the content provider 104 and any other content providers or CDN providers to which the content provider 104 sends a request for additional content may be in a trusted relationship, and may authenticate one or more of the requests and/or other transmissions with a digital handshake or any other authentication mechanism as known in the art. Illustratively, authenticating requests and/or transmissions may, in some embodiments, help discourage malfunctioning or rogue content providers from requesting large volumes of additional content that may overwhelm the network computing provider 107.

In one embodiment, any number of network resources and/or additional embedded resources may be provided to the network computing provider 107 in separate pieces over an HTML protocol or over any other communications protocol known in the art. In other embodiments, multiple resources or pieces of content may be provided to the client computing device 102 as part of a single transmission and/or as processing results corresponding to representations of one or more pieces of content. Illustratively, in one embodiment, the content provider or CDN provider seeking to provide the content may accordingly initiate the transmission of content with the network computing provider 107 over an open network connection (e.g., over a network connection previously used to transmit content), or may open a new network connection with the network computing provider 107 to transmit any available content.

At block 1718, the content provider 104 may provide the requested network resource to the network computing provider 107. In one embodiment, if the content provider 104 determines that the network computing provider 107 has an up-to-date copy of the requested network resource available, the content provider 104 may refrain from sending the network resource, and/or may provide a message or other information to the network computing provider 107, indicating that a version of the network resource at the network computing provider 107 is up-to-date. In some embodiments, the requested network may be provided by another content provider or CDN provider. For example, the content provider 104 may have provided a request for the network resource to another content provider or CDN provider on the behalf of the network computing provider 107 as discussed above with reference to block 1716.

At block 1720, routine 1700 ends. In one embodiment, the network computing provider 107 may process the provided additional content as illustratively discussed above with reference to FIG. 16.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached FIGURES should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. In various embodiments, one or more of the elements or functions described herein may be performed by any combination of one or more components or entities as discussed herein, including, but not limited to, the client computing device, the network computing provider 107, the content provider 104, and the CDN service provider 106. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
    obtaining, by a network computing provider comprising one or more computing devices configured to execute specific instructions, a client request for a network resource from a client computing device, wherein the network resource is associated with one or more embedded resources;
    providing, by the network computing provider, a network computing provider request for the network resource to a content provider separate from the network computing provider, wherein the network computing provider request includes a network component identifier, wherein the network component identifier includes information associated with a network address of the network computing provider and wherein the content provider identifies, responsive to the network computing provider request for the network resource and without receiving a network computing provider request for the one or more embedded resources in connection with the network computing provider request for the network resource, one or more embedded resource identifiers corresponding to the one or more embedded resources, associated with the network resource, to be sent to the network computing provider;
    obtaining, by the network computing provider, at least one network resource from the content provider responsive to the network computing provider request;
    obtaining, by the network computing provider in response to the network computing provider request to the content provider, the one or more embedded resources associated with the network resource from a content delivery network provider, the one or more embedded resources provided by the content delivery network provider to the network computing provider based on the network component identifier, wherein the embedded resources are provided to the network computing provider responsive to a request for the embedded resources from the content provider to the content delivery network provider based on the identified one or more embedded resource identifiers, and wherein the one or more embedded resources are obtained by the network computing provider without the network computing provider requesting the one or more embedded resources from the content provider or the content delivery network provider; and
    providing the network resource and the one or more embedded resources to the client computing device.

2. The computer-implemented method of claim 1, wherein the client request for the network resource comprises a new browse session request.

3. The computer-implemented method of claim 2, wherein providing the network resource and the one or more embedded resources to the client computing device comprises providing processing results corresponding to a representation of the network resource and the one or more embedded resources to the client computing device for display.

4. The computer-implemented method of claim 1 further comprising providing at least one embedded resource availability identifier to the content provider, wherein the at least one embedded resource availability identifier is associated with an availability of the one or more embedded resources at the network computing provider.

5. A system for obtaining network content comprising:
    one or more computer processors;
    at least one computer memory accessible by at least one of the one or more computer processors; and
    a network computing component comprising an executable software module executed by the one or more computer processors, wherein the network computing component is operable to:
    obtain a client request for a network resource from a client computing device, wherein the network resource is associated with one or more embedded resources;
    provide a network computing component request for the network resource to a first content provider;
    obtain, in response to the network computing component request to the first content provider, the one or more embedded resources associated with the network resource from a second content provider, wherein the first content provider determines the one or more embedded resources to be provided to the network computing component responsive to the network computing component request for the network resource and without receiving a network computing component request for the one or more embedded resources in connection with the network computing component request for the network resource, wherein the one or more embedded resources are provided by the second content provider to the network computing component responsive to one or more requests for the one or more embedded resources from the first content provider to the second content provider, and wherein the one or more embedded resources are obtained by the network computing component without the network computing component requesting the one or more embedded resources from the first or second content provider; and
    provide the one or more embedded resources to the client computing device.

6. The system of claim 5, wherein the network computing component is further operable to obtain the network resource from the first content provider responsive to the network computing component request.

7. The system of claim 5, wherein the one or more requests for the one or more embedded resources are based on one or more embedded resource identifiers.

8. The system of claim 7, wherein the one or more embedded resource identifiers are obtained by the first content provider based on processing of the network resource by the first content provider.

9. The system of claim 5, wherein the network computing component is further operable to provide at least one embedded resource availability identifier to the first content provider, wherein the at least one embedded resource availability identifier is associated with an availability of at least one embedded resource at the network computing component.

10. The system of claim 9, wherein the at least one embedded resource availability identifier corresponds to a hash or checksum.

11. The system of claim 9, wherein the at least one embedded resource availability identifier includes information identifying a version of at least one embedded resource available at the network computing component.

12. The system of claim 9, wherein the first content provider is configured to exclude requests for embedded resources available at the network computing component from the one or more requests for one or more embedded resources provided to the second content provider.

13. The system of claim 5, wherein the network computing component is further operable to provide a network component identifier to the first content provider, the network component identifier associated with a network address of the network computing component.

14. The system of claim 5, wherein the network computing component is further operable to provide a resource request token associated with the network computing component request to the first content provider.

15. The system of claim 14, wherein the network computing component is further operable to obtain the resource request token from the second content provider.

16. The system of claim 15, wherein the network computing component is further operable to associate the one or more embedded resources with the network computing component request based on the resource request token.

17. The system of claim 5, wherein the network resource includes a specification of identifiers corresponding to the one or more embedded resources and wherein the network computing component obtains the one or more embedded resources responsive to the client request for the network resource.

18. A computer-implemented method comprising:
obtaining, by a network computing provider comprising one or more computing devices configured to execute specific instructions, a client request for a network resource from a client computing device, wherein the network resource is associated with one or more embedded resources;
providing, by the network computing provider, a network computing provider request for the network resource to a first content provider;
obtaining, by the network computing provider, the network resource from the first content provider;
obtaining, by the network computing provider in response to the network computing provider request to the first content provider, the one or more embedded resources associated with the network resource from a second content provider, wherein the first content provider determines the one or more embedded resources to be provided to the network computing provider responsive to the network computing provider request for the network resource and without receiving a network computing provider request for the one or more embedded resources in connection with the network computing provider request for the network resource, wherein the one or more embedded resources are provided by the second content provider to the network computing provider responsive to a request for the one or more embedded resources from the first content provider to the second content provider, and wherein obtaining the one or more embedded resources associated with the network resource from a second content provider includes obtaining the one or more embedded resources without requesting the one or more embedded resources from the first or second content provider; and
providing the network resource and the one or more embedded resources to the client computing device.

19. The computer-implemented method of claim 18, wherein the second content provider corresponds to a content delivery network provider.

20. The computer-implemented method of claim 18, wherein the client request for a network resource comprises a new browse session request.

21. The computer-implemented method of claim 20, wherein providing the network resource and the one or more embedded resources to the client computing device comprises providing processing results corresponding to a representation of the network resource and the one or more embedded resources to the client computing device for display.

22. The computer-implemented method of claim 18, wherein the network computing provider is further operable to provide at least one embedded resource availability identifier to the first content provider, wherein the at least one embedded resource availability identifier is associated with an availability of at least one embedded resource at the network computing provider.

23. The computer-implemented method of claim 18 further comprising providing a network component identifier to the first content provider, the network component identifier associated with a network address of the network computing provider.

24. The computer-implemented method of claim 18 further comprising providing a resource request token associated with the network computing provider request to the first content provider.

25. The computer-implemented method of claim 24 further comprising obtaining the resource request token from the second content provider.

26. The computer-implemented method of claim 25, wherein obtaining the one or more embedded resources associated with the network resource from the second content provider includes only accepting embedded resources associated with a resource request token.

27. The computer-implemented method of claim 25 further comprising associating the one or more embedded resources with the network computing provider request based on the resource request token.

* * * * *